United States Patent
Hayakawa

(10) Patent No.: US 10,163,016 B2
(45) Date of Patent: Dec. 25, 2018

(54) PARKING SPACE DETECTION METHOD AND DEVICE

(71) Applicant: Nissan Motor Co., Ltd., Yokohama-shi, Kanagawa (JP)

(72) Inventor: Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/769,292

(22) PCT Filed: Oct. 22, 2015

(86) PCT No.: PCT/JP2015/079895
§ 371 (c)(1),
(2) Date: Apr. 18, 2018

(87) PCT Pub. No.: WO2017/068701
PCT Pub. Date: Apr. 27, 2017

(65) Prior Publication Data
US 2018/0322349 A1    Nov. 8, 2018

(51) Int. Cl.
*G06T 7/62* (2017.01)
*G06K 9/00* (2006.01)

(52) U.S. Cl.
CPC ..... *G06K 9/00812* (2013.01); *G06K 9/00825* (2013.01); *G06T 7/62* (2017.01); *G06T 2207/30264* (2013.01)

(58) Field of Classification Search
CPC combination set(s) only.
See application file for complete search history.

(56) References Cited

U.S. PATENT DOCUMENTS

| | | | |
|---|---|---|---|
| 8,923,565 B1* | 12/2014 | Zhang | G08G 1/04 340/932.2 |
| 9,393,869 B2* | 7/2016 | Oiki | B60W 50/12 |
| 9,773,413 B1* | 9/2017 | Li | G05D 1/021 |
| 2009/0121899 A1* | 5/2009 | Kakinami | B62D 15/027 340/932.2 |
| 2013/0060421 A1 | 3/2013 | Kadowaki et al. | |
| 2013/0162829 A1 | 6/2013 | Kadowaki et al. | |

FOREIGN PATENT DOCUMENTS

| | | |
|---|---|---|
| EP | 2583869 A1 | 4/2013 |
| JP | 2001202596 A | 7/2001 |
| JP | 2010198440 A | 9/2010 |
| WO | 2016002405 A1 | 1/2016 |

* cited by examiner

*Primary Examiner* — Behrooz M Senfi
(74) *Attorney, Agent, or Firm* — Young Basile Hanlon & MacFarlane, P.C.

(57) ABSTRACT

A parking space detection method detects a parking space in an empty state from a captured image acquired by a camera configured to capture an image of a parking lot. The method includes detecting a parked vehicle existing in a parking space on the far side from the subject vehicle and adjacent to a determination target parking space for which the empty state is determined and measuring a lateral length of the parked vehicle on a surface located at the side of the determination target parking space. When the lateral length is a predetermined value or more, the determination target parking space is detected as a parking space in the empty state.

5 Claims, 26 Drawing Sheets

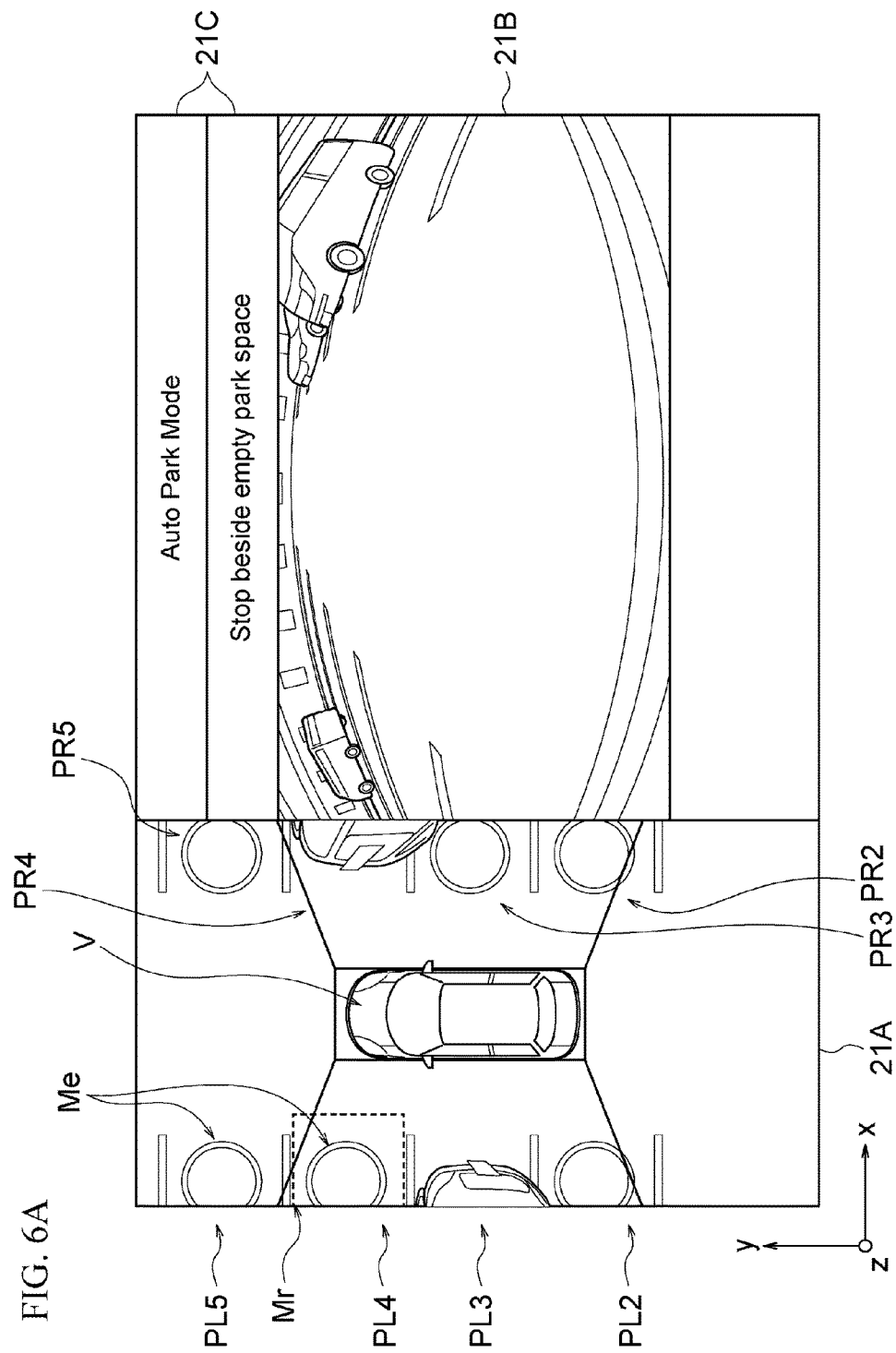

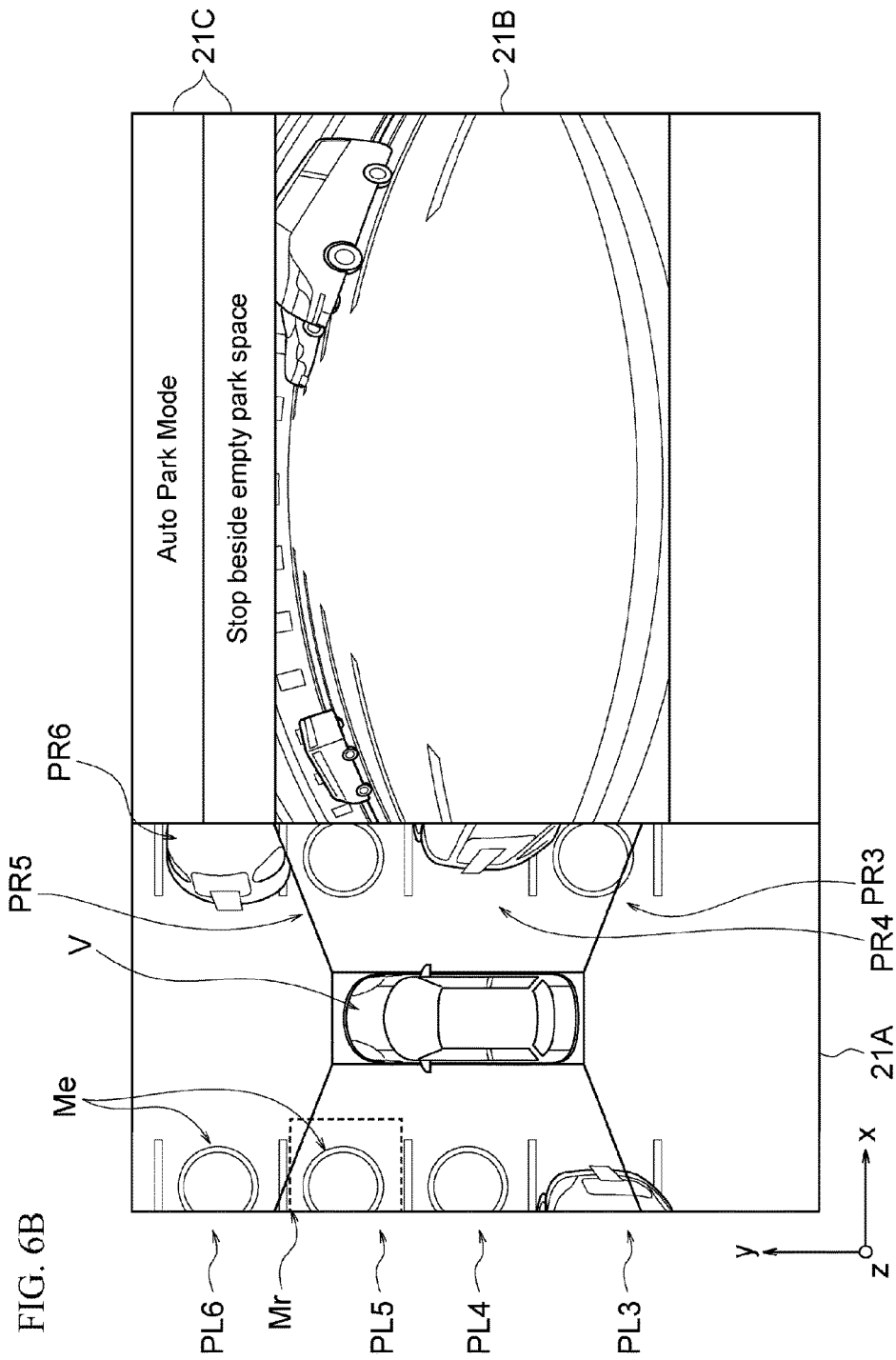

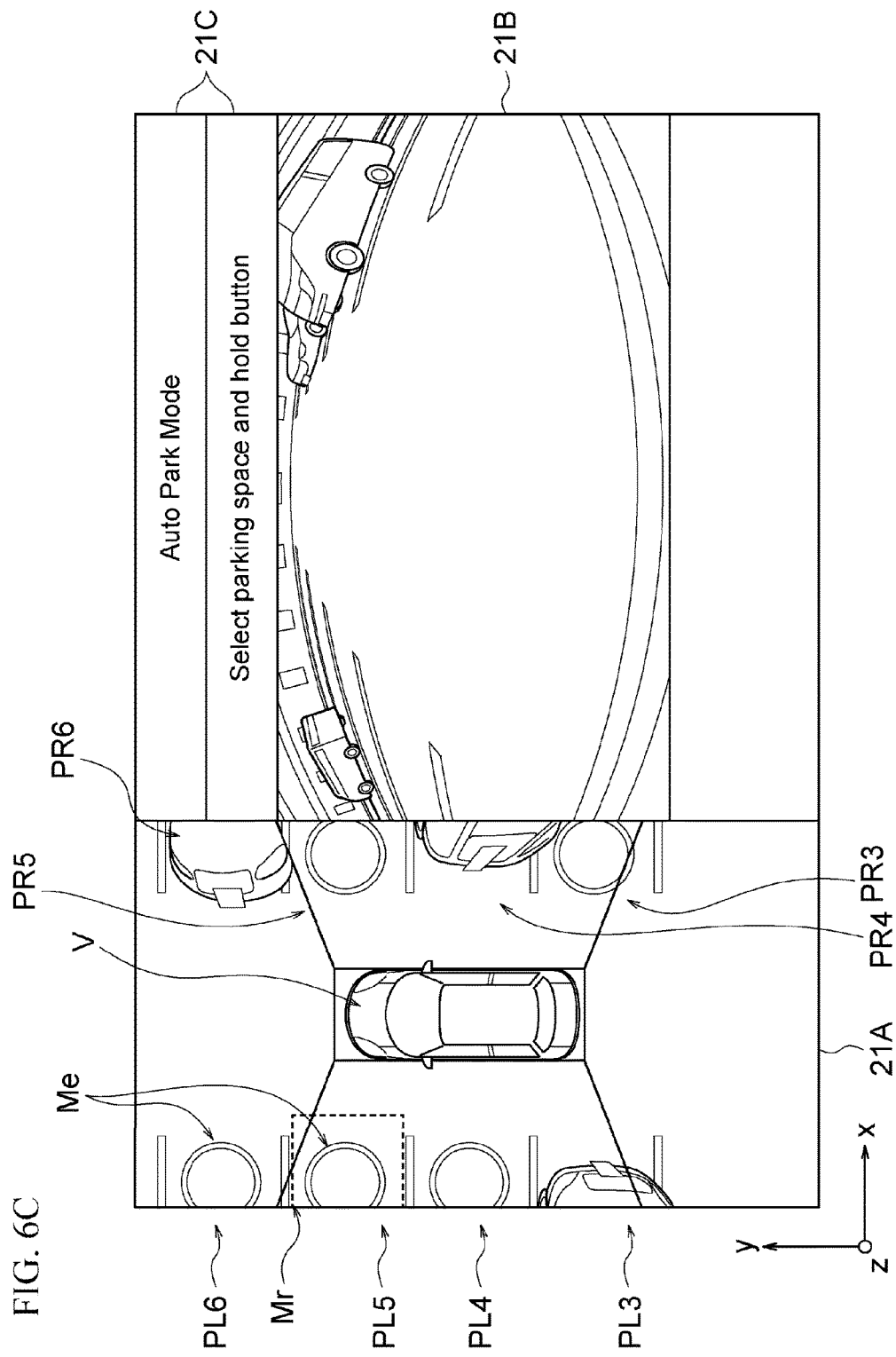

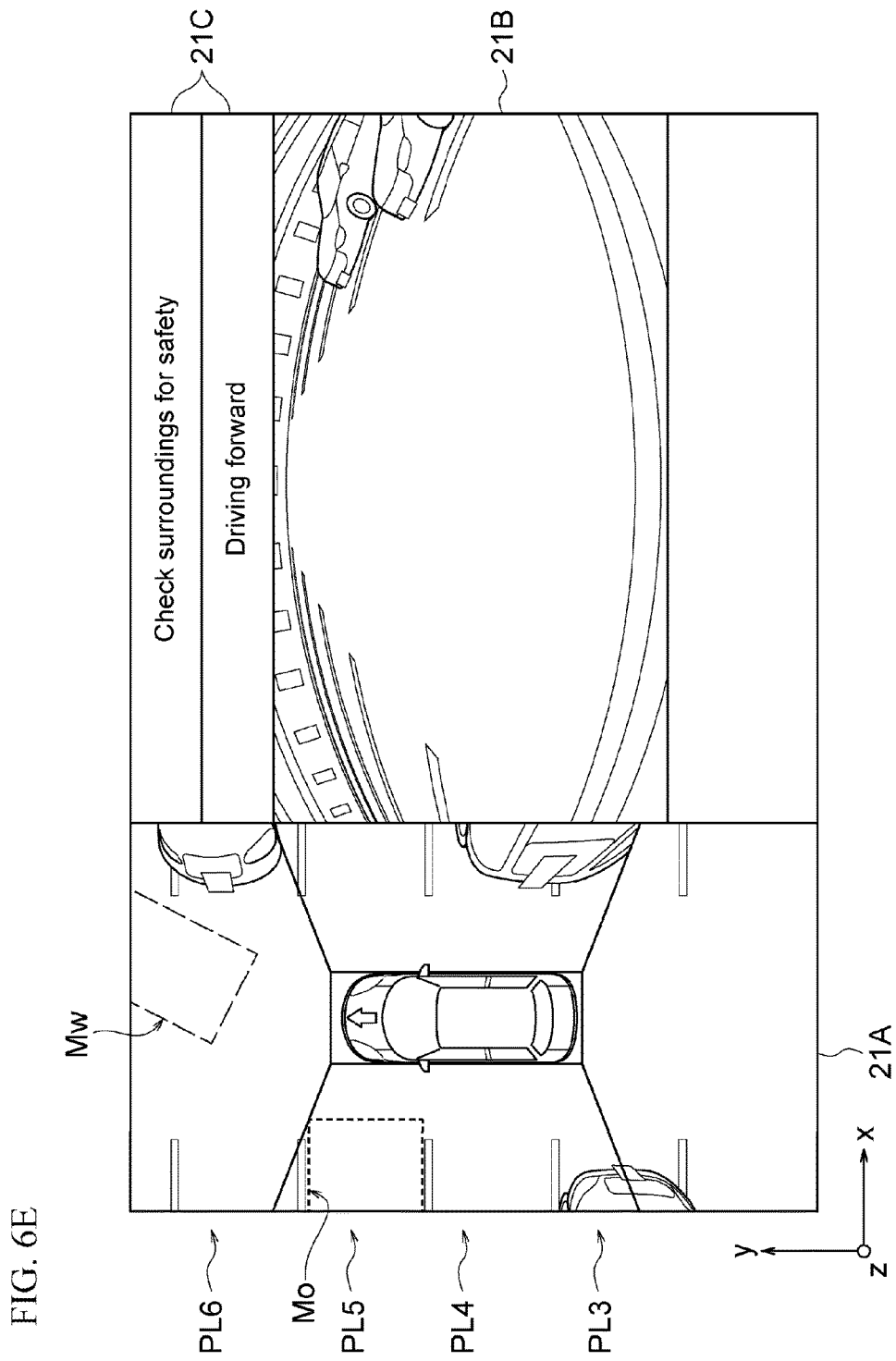

PARKING SPACE DETECTION METHOD AND DEVICE

TECHNICAL FIELD

The present invention relates to a parking space detection method and a parking space detection device.

BACKGROUND

A parking detection device is known which is used for detecting empty and parking in a parking space. This device is configured to capture an image of the parking space by an image capture means disposed in a parking lot and detect empty and parking in the parking space on the basis of whether or not a white line on the far side from the image capture means is detected from among white lines of the parking space (see Japanese Patent Application JP2001-202596A).

When the detection of white lines of a parking space is difficult, unfortunately, the white lines of a parking space may not be detected even though the parking space is in an empty state. Thus, a problem is that the parking state may be erroneously detected.

SUMMARY

A problem to be solved by the present invention is to provide a parking space detection method and a parking space detection device with which a parking space in the empty state can be detected even when the detection of white lines of the parking space is difficult.

The present invention solves the above problem through detecting a parked vehicle existing in a parking space on a far side from the parking situation detector, the parking space being adjacent to a determination target parking space for which the empty state is determined; and when a predetermined feature is detected from a region on a far side from the parking situation detector among right and left regions of a surface of the parked vehicle located at a side of the determination target parking space, detecting the determination target parking space as the parking space in the empty state.

The present invention has an effect that, even when the detection of white lines of a parking space is difficult, the empty state of the determination target parking space can be detected on the basis of the length of the parked vehicle existing in the parking space on the far side from the subject vehicle and adjacent to the determination target parking space.

BRIEF DESCRIPTION OF THE DRAWINGS

FIG. 6A is a first view for describing an example of a display screen in the parking assist process according to one or more embodiments of the present invention;

FIG. 6B is a second view for describing an example of a display screen in the parking assist process according to one or more embodiments of the present invention;

FIG. 6C is a third view for describing an example of a display screen in the parking assist process according to one or more embodiments of the present invention;

FIG. 6E is a view for describing an example of a display screen in the parking assist process according to one or more embodiments of the present invention;

DETAILED DESCRIPTION OF THE EMBODIMENTS

Figure 1:
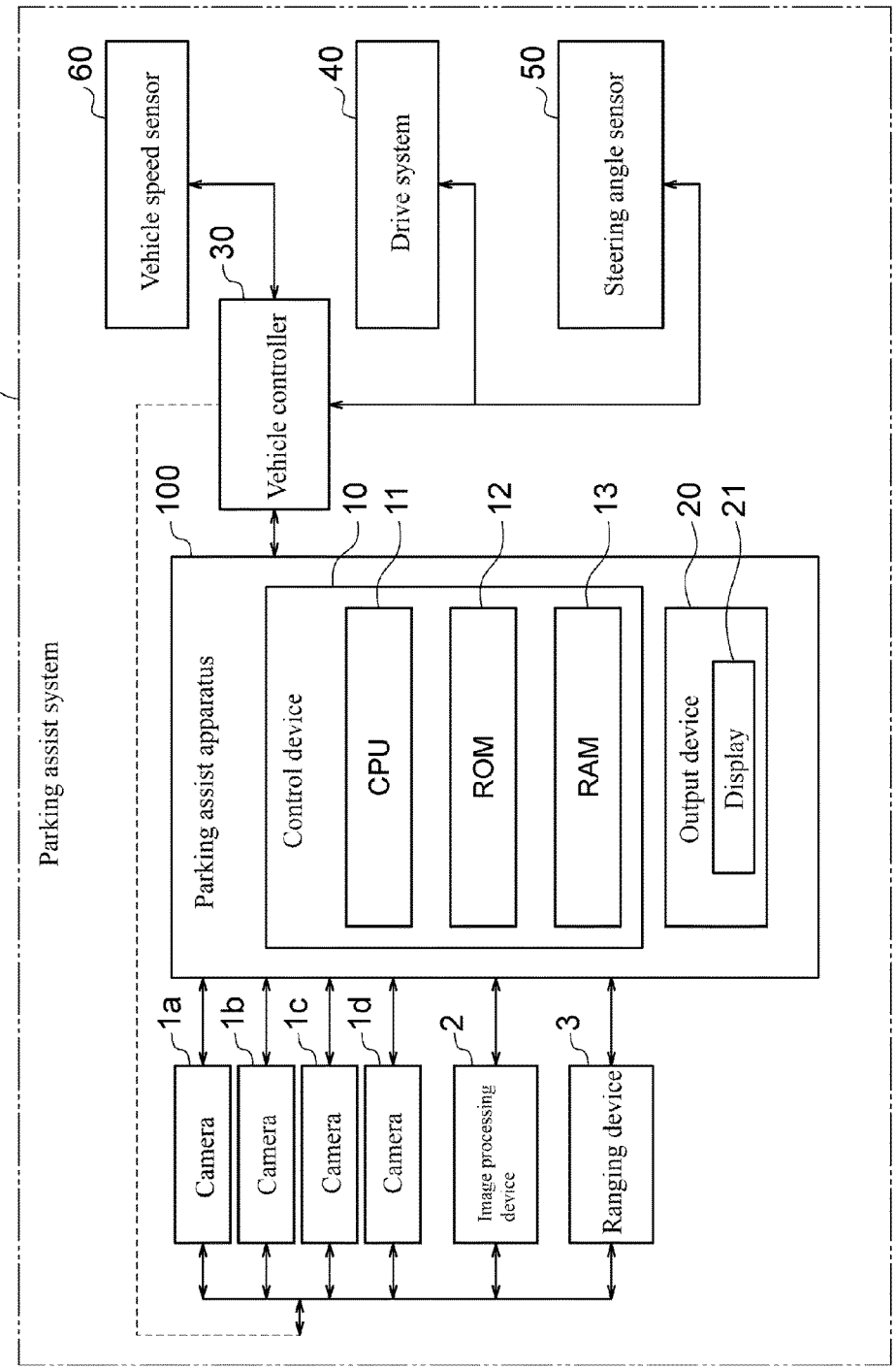
FIG. 1 is a block diagram illustrating an example of a parking assist system according to one or more embodiments of the present invention.

FIG. 1 is a block diagram of a parking assist system 1000 having a parking assist apparatus 100 according to one or more embodiments of the present invention. The parking assist system 1000 according to one or more embodiments of the present invention assists an operation of moving (parking) a subject vehicle into a parking space. The parking assist system 1000 according to one or more embodiments of the present invention includes cameras 1a to 1d, an image processing device 2, a ranging device 3, the parking assist apparatus 100, a vehicle controller 30, a drive system 40, a steering angle sensor 50, and a vehicle speed sensor 60. The parking assist apparatus 100 according to one or more embodiments of the present invention includes a control device 10 and an output device 20. The output device 20 includes a display 21, a speaker 22, and a lamp 23. These components are connected to one another via a controller area network (CAN) or other in-vehicle LAN to mutually exchange information.

The control device 10 of the parking assist apparatus 100 according to one or more embodiments of the present invention is a specific computer comprising a ROM 12 that stores a parking assist program, a CPU as an operation circuit that executes the program stored in the ROM 12 to serve as the parking assist apparatus 100 according to one or more embodiments of the present invention, and a RAM 13 that serves as an accessible storage device.

The parking assist program according to one or more embodiments of the present invention is a program for execution of a control procedure of presenting parking spaces, into which parking is possible, on the display 21 and assisting an operation to park the subject vehicle into a parking space set by the user as the target parking space. The parking assist program according to one or more embodiments of the present invention can be applied to automated parking in which the steering, accelerator, and brake are operated to automatically park a vehicle and can also be applied to semiautomated parking in which at least one operation of the steering, accelerator, and brake is manually performed and other operations are automatically performed for parking. In addition or alternatively, the parking assist program can be applied to a function with which a travel route to a parking space is presented and the parking is assisted by guidance to the parking space.

The control device 10 of the parking assist apparatus 100 according to one or more embodiments of the present invention has functions of executing an information acquisition process, an available parking space detection process, a recommended available parking space detection process, and a display control process. Each of the above processes is executed by cooperation of software for implementing the process and the above-described hardware.

Figure 2:
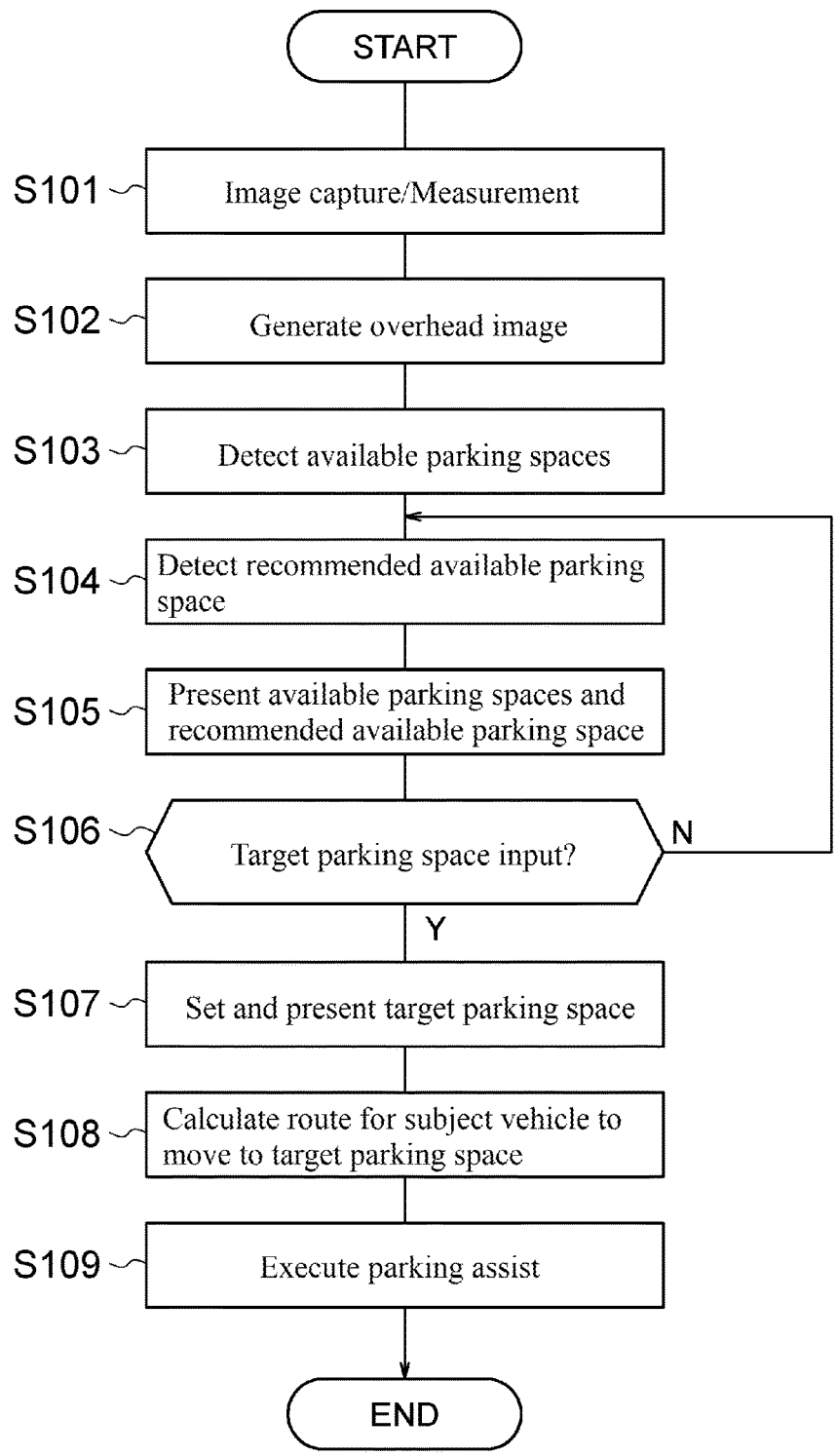
FIG. 2 is a flowchart illustrating an example of a control procedure in the parking assist system according to one or more embodiments of the present invention.

FIG. 2 is a flowchart illustrating a control procedure of the parking assist process executed by the parking assist system 1000 according to one or more embodiments of the present invention. The trigger for starting the parking assist process is not particularly limited, and the parking assist process may be triggered by the operation of a start switch of the parking assist apparatus 100.

The parking assist apparatus 100 according to one or more embodiments of the present invention has a function for automatically moving the subject vehicle to a parking space. In this process, one or more embodiments of the present invention use a switch that operates only while being turned on, such as a deadman switch. In the parking assist apparatus 100, the automated driving of the subject vehicle is executed when the deadman switch is pressed and the automated driving of the subject vehicle is suspended when the pressing of the deadman switch is released.

Specifically, in step S101, the control device 10 of the parking assist apparatus 100 according to one or more embodiments of the present invention acquires images captured by the cameras 1a to 1d attached to multiple sites of the subject vehicle. The cameras 1a to 1d capture images of boundary lines of parking spaces around the subject vehicle and objects existing around the parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects correspond to obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

Figure 3:
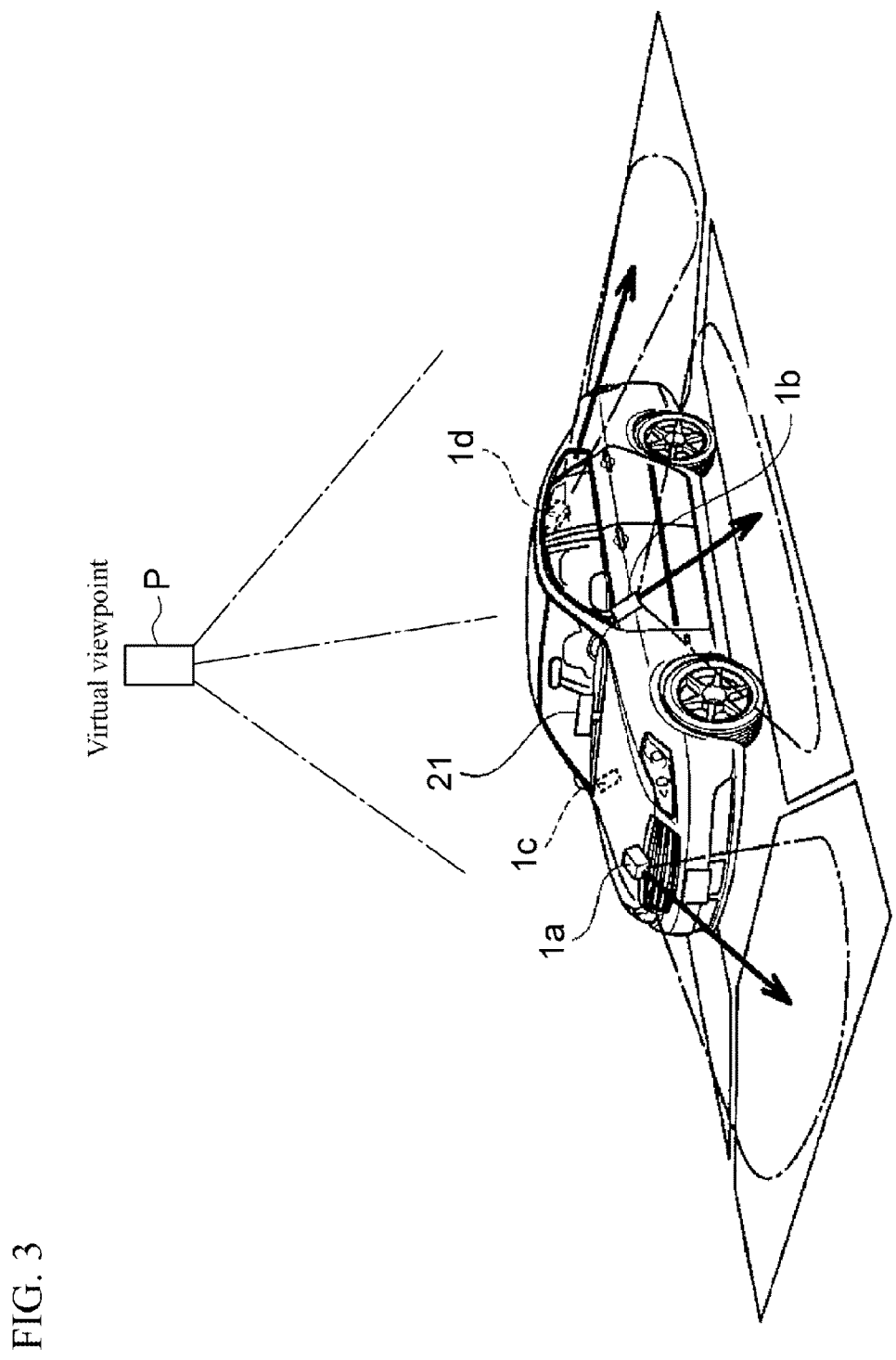
FIG. 3 is a view illustrating an example of positions at which on-board cameras are arranged according to one or more embodiments of the present invention.

FIG. 3 is a view illustrating an exemplary arrangement of the cameras 1a to 1d disposed on the subject vehicle. In the example illustrated in FIG. 3, the camera 1a is disposed on the front grille part of the subject vehicle, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step S101, the control device 10 also acquires ranging signals from the ranging device 3, which may be a plurality of modules attached to multiple sites of the subject vehicle.

In step S102, the control device 10 of the parking assist apparatus 100 controls the image processing device 2 to generate an overhead image. The image processing device 2 generates the overhead image on the basis of the acquired plurality of captured images. The overhead image is an image in which the surrounding state including the subject vehicle and the parking space for the subject vehicle to park is viewed from a virtual viewpoint P (see FIG. 3) above the subject vehicle. The image processing performed by the image processing device 2 may be conducted, for example, using a method as disclosed in "Development of Around View System, Proceedings of Society of JSAE Annual Congress, 116-07 (October 2007), pp. 17-22, SUZUKI Masayasu, CHINOMI Satoshi, TAKANO Teruhisa." Examples of a generated overhead image 21A are illustrated in FIGS. 6A to 6E, which will be described later. These figures each illustrate a display example that simultaneously displays the overhead image (top view) 21A around the subject vehicle and a monitoring image (normal view) 21B around the subject vehicle.

Referring again to FIG. 2, in step S103, available parking spaces Me are detected. The available parking spaces Me are parking spaces into which the subject vehicle can be parked. The control device 10 detects the available parking spaces Me on the basis of the images captured by the cameras 1a to 1d and/or the ranging signals from the ranging device 3. In the above description, the available parking spaces Me are detected from the images captured by the on-board cameras, but the present invention is not limited to this, and necessary information may be acquired from an external server to specify the available parking spaces.

A method of detecting the available parking spaces Me will be described below. The control device 10 determines whether or not the subject vehicle is traveling in an area that includes parking spaces (such an area will also be referred to as a "parking area," hereinafter), on the basis of the vehicle speed, positional information of a navigation system, etc. For example, when the vehicle speed of the subject vehicle is a predetermined vehicle speed threshold or less and this state continues for a predetermined time or more, the control device 10 determines that the subject vehicle is traveling in a parking area. In addition or alternatively, the control device 10 specifies, for example, parking spaces of a highway or the like from the positional information of the navigation system thereby to determine that the subject vehicle is traveling in a parking area. In one or more embodiments of the present invention, a determination may be made as to whether or not the detected area is an area including parking spaces, via communication with the outside of the vehicle, such as so-called road-to-vehicle communication and vehicle-to-vehicle communication.

When a determination is made that the subject vehicle is traveling in a parking area, the control device 10 detects frame lines on the basis of the overhead image generated by the image processing device 2. Frame lines are boundary lines that define frames (regions) of parking spaces. The control device 10 performs edge detection on the captured images. In the edge detection, the control device 10 detects a pixel array in which the luminance difference between each pixel and its adjacent pixel is a predetermined value or more from the overhead image. Then, when the length of the detected pixel array is a predetermined threshold or more, the control device 10 detects a line of which the edge is defined by the pixel array, as a frame line. The control device 10 also detects whether or not there is a line that has a higher possibility of being a frame line than the detected frame line, around the portion detected as the frame line. For example, when a line having a larger luminance difference is newly detected, the newly detected line is detected as a line having a higher possibility of being a frame line. In one or more embodiments of the present invention, color of frame lines is white, but the present invention is not limited to this, and other colors such as red may also be employed.

Figure 7C:
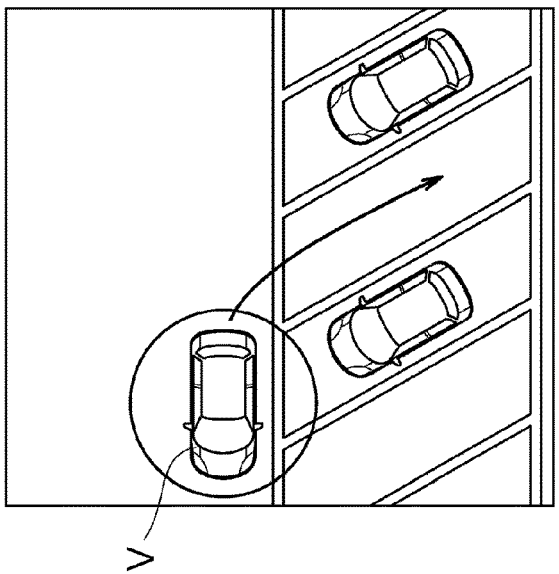
FIGS. 7A-7C are a set of views illustrating examples of parking patterns to which the parking assist process according to one or more embodiments of the present invention is applied.
Figure 7B:
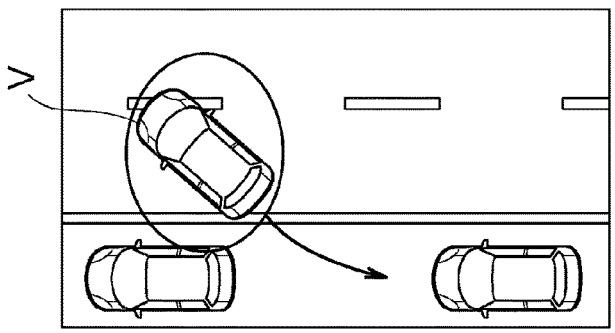
Figure 7A:
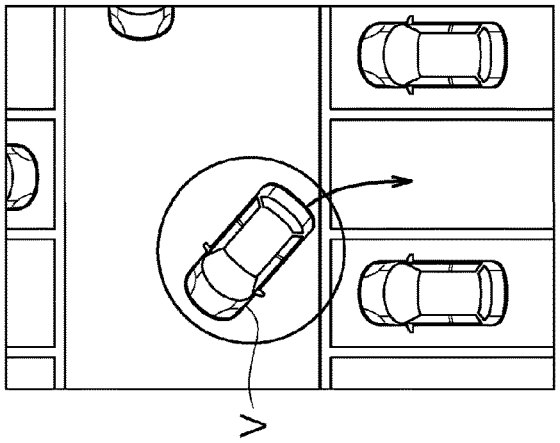

The ROM 12 of the control device 10 preliminarily stores information on the patterns of parking frames. Examples of the patterns of parking frames include those in a right-angle parking scheme as illustrated in FIG. 7A, which will be described later, those in a parallel parking as illustrated in FIG. 7B, which will be described later, and those in an angle parking scheme as illustrated in FIG. 7C, which will be described later.

When the candidate of a frame line detected from the overhead image satisfies the following three conditions, the control device 10 detects the candidate of a frame line as a frame line and detects a space defined by the frame line as a parking space. The first condition is that the distance from the candidate of another frame line or a detected frame line falls within a predetermined threshold range (e.g. an actual distance of 2 to 2.5 [m]). The second condition is that the relative angle with the candidate of another frame line or a detected frame line falls within a predetermined threshold range (e.g. −10° to +10°). The third condition is that lines extracted as candidates of parking frame lines do not include a line having a length equal to or smaller than a first line length threshold that is preliminarily set (e.g. a length corresponding to an actual distance of 15 [m]). In the above description, when the three conditions are satisfied, a white line is detected, but the present invention is not limited to this. In an alternative embodiment, when any combination of the conditions is satisfied or when at least one condition is satisfied, a white line may be detected.

When parking spaces that satisfy the above three conditions are specified, the control device 10 determines whether or not obstacles are present in the specified parking spaces using the detection data from the ranging device 3. In addition, the control device 10 determines whether or not the specified parking spaces are those into which parking is possible by automated driving, on the basis of a travel route of the automated driving. For example, parking spaces for which a travel route of the automated driving cannot be ensured, such as parking spaces facing a wall, do not correspond to parking spaces into which parking is possible by the automated driving. Then, the control device 10 sets parking spaces, among the specified parking spaces, in which no obstacles exist and into which parking is possible by the automated driving, as the available parking spaces Me. Thus, the control device 10 detects the available parking spaces Me. In the above description, parking spaces of which the parking frame lines are detected are detected as the available parking spaces Me, but in one or more embodiments of the present invention, the detection scheme is not limited to the above. In addition or alternatively, even if parking frame lines cannot be detected, parking spaces satisfying a predetermined condition may be detected as the available parking spaces Me, such as when empty spaces having a certain region are detected and when parking spaces were used for parking in past times.

Figure 4A:
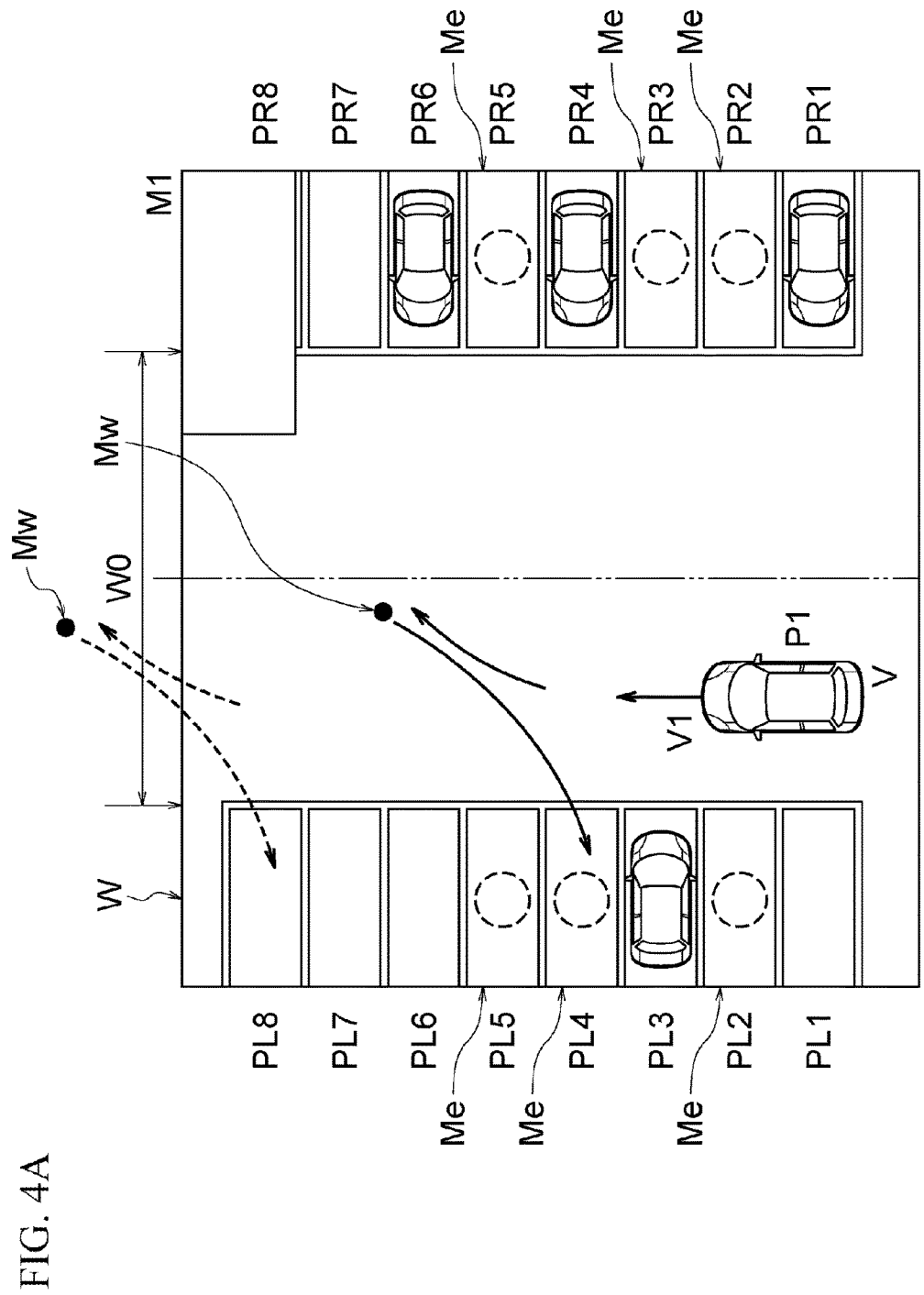
FIG. 4A is a first view for describing an example of a parking assist process according to one or more embodiments of the present invention.

FIG. 4A is a first view for describing an example of the parking assist process according to one or more embodiments of the present invention. In FIG. 4A, arrows represent a travel route when the vehicle is parked by automated driving. Dotted circles represent the available parking spaces Me detected at the position P1. In the parking area illustrated in FIG. 4A, an obstacle M1 exists on the parking space PR8, and the control device 10 therefore does not specify the parking space PR8 as an available parking space Me. With regard to the parking space PL8, a travel route cannot be ensured in the automated driving because a wall W interferes with the travel route (corresponding to dotted arrows in FIG. 4A), and the parking space PL8 is therefore not a parking space suitable for the automated driving. Accordingly, the control device 10 does not specify the parking space PL8 as an available parking space Me. Parked vehicles exist in the parking spaces PR1, PR4, PR6, and PL3, and the control device 10 therefore does not specify them as available parking spaces Me. The control device 10 specifies the parking spaces PL1, PL2, PL4 to PL7, PR2, PR3, PR5, and PR7 as available parking spaces Me.

As illustrated in FIG. 4A, the position of the subject vehicle traveling is P1 and the vehicle speed is V1. The control apparatus 10 sets a range that includes the parking spaces PL2 to PL5 and PR2 to PR5, among the parking spaces included in the images captured at the position P1 of the subject vehicle V, as the detection range for available parking spaces Me. The detection range for available parking spaces Me during the vehicle's travel is not limited to the range of parking spaces PL2 to PL5 and PR2 to PR5, and may also be the range of parking spaces PL1 to PL8 and PR1 to PR8, for example. In FIG. 4A and in FIGS. 4B to 4D which will be described later, the movement of the subject vehicle V is represented in a temporal sequence, and the position of the subject vehicle V moves in the order of FIG. 4A, FIG. 4B, FIG. 4C, and FIG. 4D. The state of the subject vehicle V illustrated in FIG. 4E, which will be described later, is not included in the temporal sequence expressed in FIGS. 4A to 4D.

Referring again to FIG. 2, in step S104, a recommended available parking space Mr is detected. The recommended available parking space Mr is an available parking space suitable for parking the subject vehicle. The control device 10 detects the recommended available parking space Mr in accordance with the traveling state of the subject vehicle from among the detected plurality of available parking spaces.

A method of detecting the recommended available parking space Mr will be described below. The control device 10 calculates the travel route when parking into each of the available parking spaces Me. The travel route to be calculated is a route from the start position of the automated driving to the position of an available parking space Me. The control device 10 specifies the start position of the automated driving for each of the available parking spaces Me. The control device 10 sets the travel route of the automated driving for the start position of the automated driving. The travel route of the automated driving is not limited to being one. The control device 10 sets an appropriate travel route in accordance with the surrounding situations when performing the automated driving. The route to be calculated is a travel route when the subject vehicle moves on the travel route from the start position of the automated driving and arrives at the position of the available parking space Me (position at which the parking is completed).

The travel route is different for each available parking space Me in accordance with the number of turns for parking, the travel distance, the maximum steering angle, etc. When the vehicle travels along a travel route by the automated driving, therefore, the required time for parking is different for each available parking space Me. For example, the required time for parking will be shorter as the number of turns for parking is smaller, as the distance of a travel route is shorter, or as the maximum steering angle is smaller. As illustrated in FIG. 4A, on the assumption of parking into the available parking space PL6 or PL7, the distance from the vicinity of the parking space PL7 to the wall Wa is shorter than the distance from the vicinity of the parking space PL6 to the wall W. The number of turns for parking when parking into the parking space PL7 is therefore larger than the number of turns for parking when parking into the parking space PL6, and the required time for parking into the parking space PL7 is longer than the required time for parking into the parking space PL6.

The control device 10 then calculates a gaze point distance on the basis of the vehicle speed of the subject vehicle V. The gaze point distance corresponds to a distance from the position of the subject vehicle V to the position which the driver of the subject vehicle V gazes on. The higher the vehicle speed, the farther the driver gazes on. Thus, the higher the vehicle speed, the longer the gaze point distance. The gaze point distance may be the length of a straight line directing ahead of the subject vehicle V. The line corresponding to the gaze point distance does not have to be a straight line and may also be defined along a curve. When the gaze point distance is defined along a curve, the curvature of the curve may be associated with the steering angle.

Figure 5:
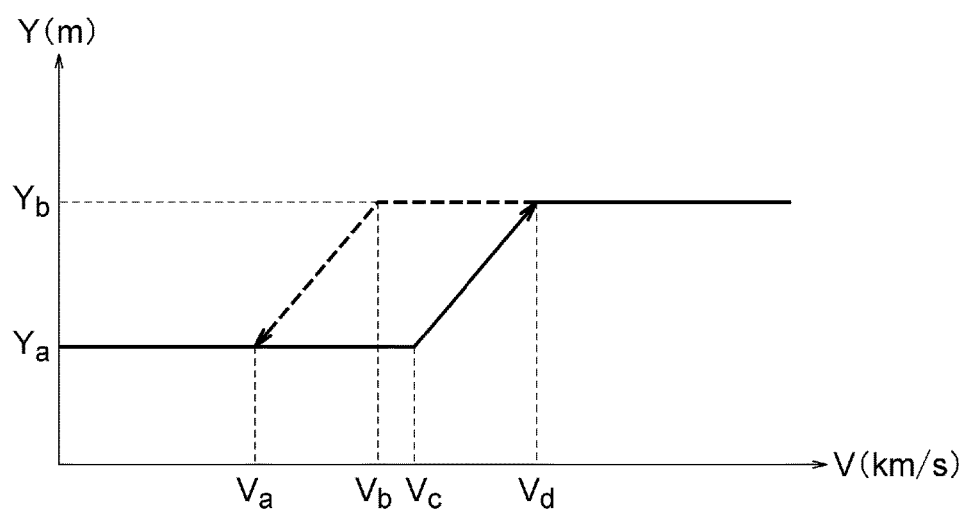
FIG. 5 is a graph illustrating the relationship between a vehicle speed (V [km/s]) and a gaze point distance (Y [m])

FIG. 5 is a graph illustrating the relationship between the vehicle speed (V [km/s]) and the gaze point distance (Y [m]). The solid line represents a characteristic when the vehicle speed increases while the broken line represents a characteristic when the vehicle speed decreases. As illustrated in FIG. 5, when the vehicle speed is Va or lower, the gaze point distance is Ya. When the vehicle speed increases from Va to Vc, the gaze point distance maintains Ya. Then, as the vehicle speed increases from the state of Vc, the gaze point distance increases in proportion to the vehicle speed within a range of Vc or higher and Vd or lower of the vehicle speed. When the vehicle speed is Vd or higher, the gaze point distance maintains Yb. On the other hand, when the vehicle speed lowers from the state of Vd, the gaze point distance maintains Yb until the vehicle speed returns to Vb from Vd. The gaze point distance decreases in proportion to the vehicle speed within a range of Va or higher and Vc or lower of the vehicle speed. Thus, the characteristic representing the relationship between the vehicle speed and the gaze point distance is a hysteresis characteristic between the increasing direction and decreasing direction of the vehicle speed.

The ROM 12 of the control device 10 stores the relationship between the vehicle speed and the gaze point distance as a map. When acquiring the information on the vehicle speed from the vehicle speed sensor 60, the control device 10 refers to the map to calculate the gaze point distance corresponding to the vehicle speed.

Figure 4B:
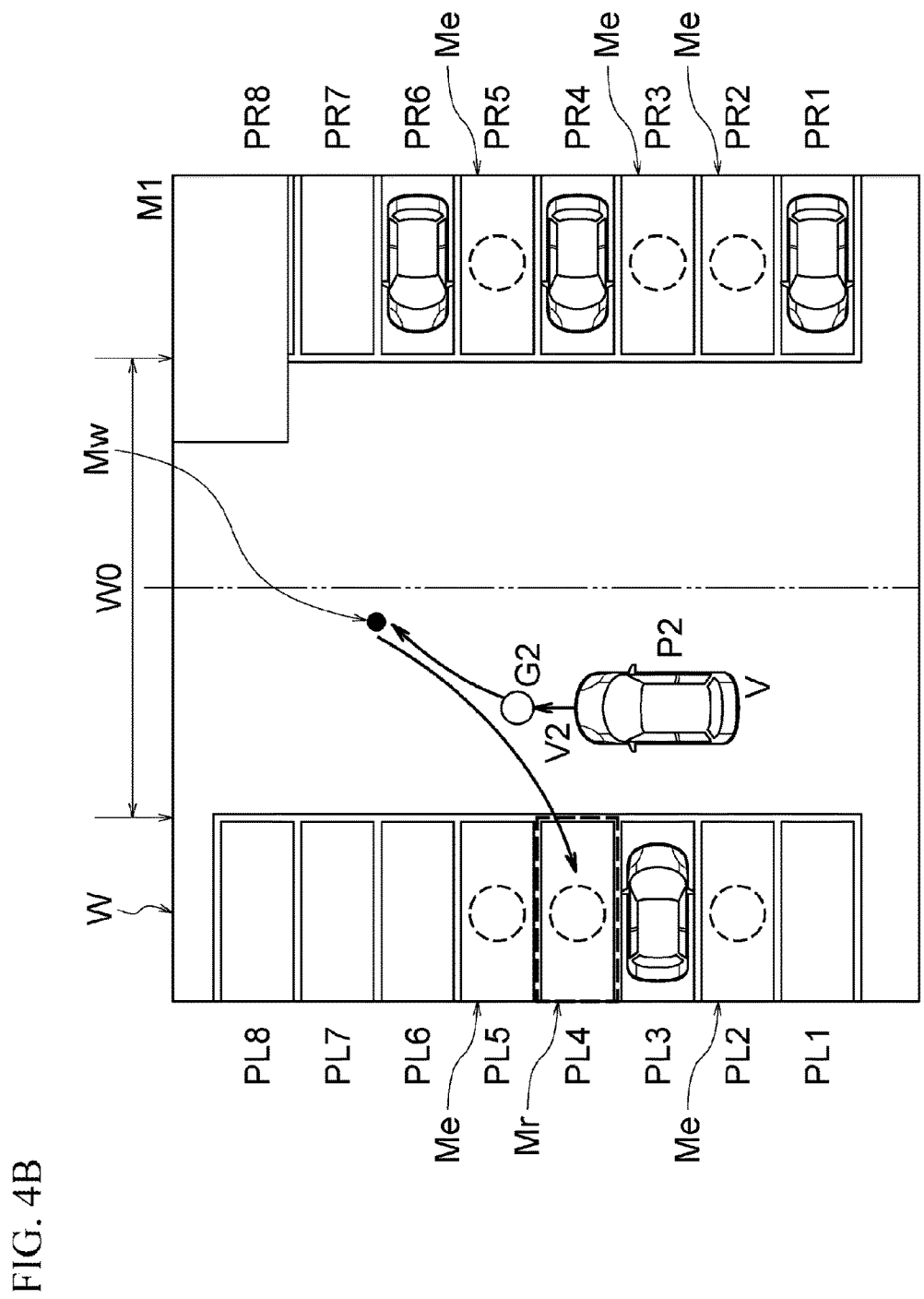
FIG. 4B is a second view for describing an example of the parking assist process according to one or more embodiments of the present invention.

FIG. 4B is a second view for describing an example of the parking assist process according to one or more embodiments of the present invention. In FIG. 4B, the position of the subject vehicle traveling is P2 and the vehicle speed is V2. The control device 10 calculates the gaze point distance corresponding to the vehicle speed V2. The control device 10 sets a position separate from the position P2 by the gaze point distance as a gaze point G2.

The control device 10 then assigns numbers for identification to the available parking spaces Me in the vicinity of the gaze point G2. For example, the numbers are given in the order of proximity to the gaze point G2. The control device 10 calculates the ease of entry into each available parking space Me. The index of the ease of entry into an available parking space Me is a travel time for the subject vehicle V to be parked into the available parking space Me by the automated driving and corresponds to the required time for parking. The required time for parking is a time when traveling by the automated driving along the travel route calculated for each available parking space Me. The ease of entry into an available parking space Me is therefore determined in accordance with the travel distance, the number of operations (the number of turns for parking), the maximum steering angle, the vehicle speed, etc. The index of the ease of entry into an available parking space Me may include not only the required time for parking but also other factors such as the certainty of parking in the automated driving. The control device 10 calculates the required time for parking into each available parking space Me. In the example of FIG.

4B, the control device 10 calculates the required time for parking into each of the available parking spaces PL2, PL4, PL5, PR2, PR3, and PR5.

The control device 10 compares the required time for parking into each available parking space Me with a predetermined required time threshold. The required time threshold is a value that is preliminarily set and an upper limit of the required time when parking by the automated driving. When the required time for parking into an available parking space Me is longer than the required time threshold, the control device 10 does not specify the available parking space Me as the recommended available parking space Mr.

After specifying the available parking spaces Me with which the required time for parking is shorter than the required time threshold, the control device 10 sets an available parking space Me that is closest to the gaze point among the specified available parking spaces Me as the recommended available parking space Mr. In the example of FIG. 4B, the required time for parking into the parking space PL4 is shorter than the required time threshold, and the parking space PL4 is located closest to the gaze point. The control device 10 therefore sets the parking space PL4 as the recommended available parking space Mr. In one or more embodiments of the present invention, an available parking space Me with which the required time for parking is shortest may be detected as the recommended available parking space.

Referring again to FIG. 2, in step 105, the available parking spaces Me and the recommended available parking space Mr are presented. The control device 10 controls the display 21 to display the set available parking spaces Me and the set recommended available parking space Mr thereby to present them to the driver and passengers.

FIG. 6A is a first view for describing an example of a display screen in the parking assist process according to one or more embodiments of the present invention. The display screen of FIG. 6A is a display screen when the subject vehicle V is traveling at the position P2 of FIG. 4B. The overhead image (top view) 21A displayed on the left side of the screen of the display 21 includes an image (of boundary lines of parking spaces) that indicates the parking spaces PL2 to PL5 and PR2 to PR5. The center of the overhead image (top view) 21A is displayed with an icon of the subject vehicle V indicating the position of the subject vehicle V. The monitoring image (normal view) can be displayed as any of images captured by different cameras 1a to 1d in accordance with the operation state of the subject vehicle V. The example illustrated in FIG. 6A is displayed as an image captured by the camera 1a which is disposed on the front grill part of the subject vehicle V. When the subject vehicle V moves back, the monitoring image may be displayed as an image captured by the camera 1d which is disposed in the vicinity of the rear bumper. The image 21C is an image for messages.

As illustrated in FIG. 6A, parking spaces PL2, PL4, PL5, PR2, PR3, and PR5 are displayed with circles representing the available parking spaces Me, and the parking space PL4 is displayed with a dotted frame representing the recommended available parking space Mr. The parking spaces PL3 and PR4 are each displayed with an overhead image of a part of a vehicle. The driver and passengers of the subject vehicle can confirm the positions of the available parking spaces Me and the position of the recommended available parking space Mr from the display screen of the display 21. In addition, from the messages included in the image 21C, the driver and passengers can confirm that the automated driving mode is effective and the vehicle is required to stop for performing the automated driving.

Referring again to FIG. 2, in step S106, a determination is made as to whether or not a target parking space Mo is input. The target parking space Mo is a parking space into which the vehicle is parked by the automated driving, and represents a location to be the target in the automated driving. The target parking space Mo is set on the basis of the operation by the driver or a passenger. For example, when the display 21 is a touch panel-type display, the driver or a passenger touches a portion representing a desired parking space thereby to designate the target parking space Mo, and information on the target parking space Mo is input to the control device 10.

When the target parking space Mo is input, the control flow proceeds to step S107. On the other hand, when the target parking space Mo is not input, the control flow returns to step S104, and the control flow from step S104 to step S106 is repeatedly executed.

The control flow of the loop portion from step S104 to step S106 will be described. In the situation in which the subject vehicle V is traveling at the position P2 illustrated in FIG. 4B, when the target parking space Mo is not input, the position of the gaze point moves forward because the subject vehicle V is traveling.

Figure 4C:
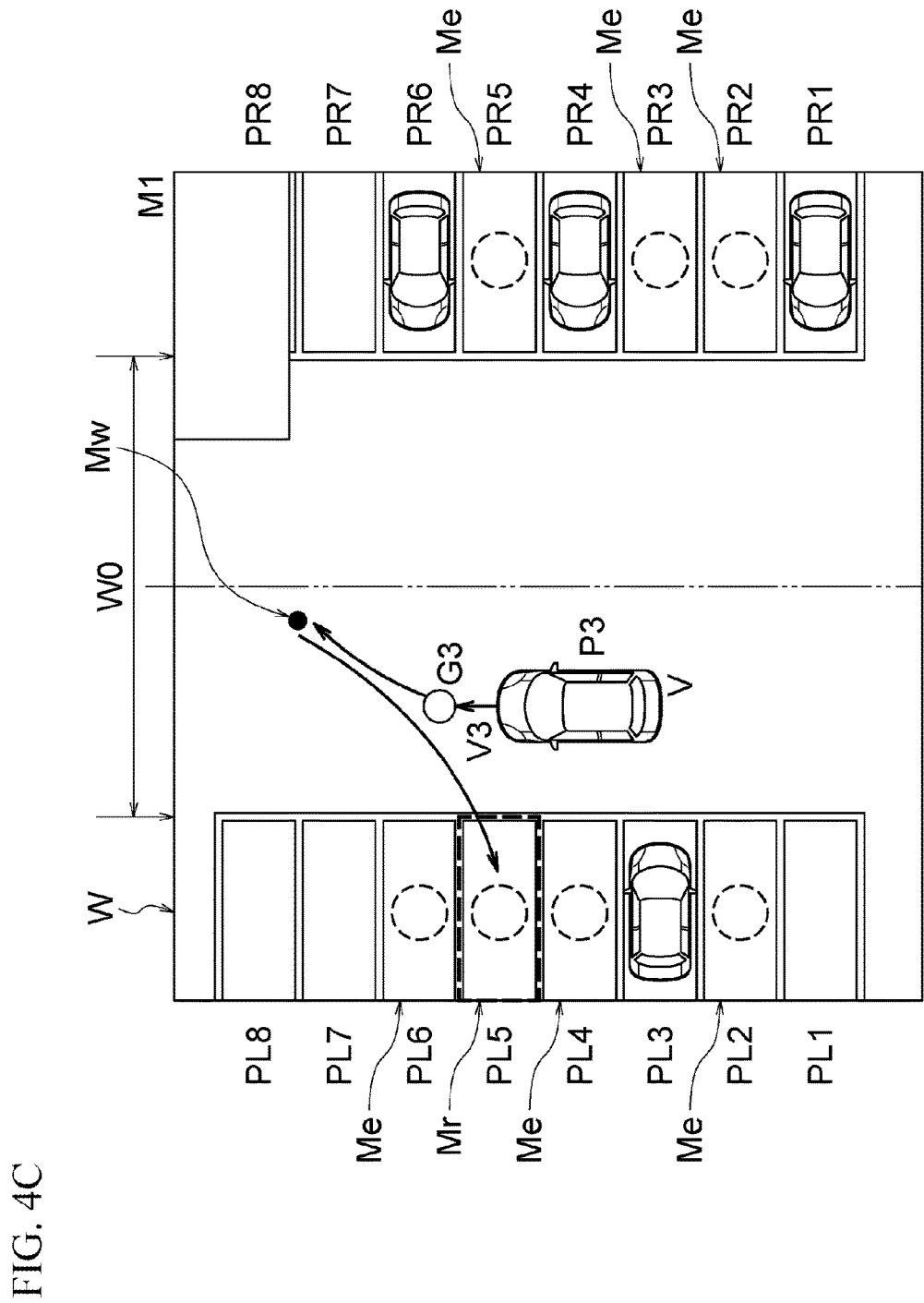
FIG. 4C is a third view for describing an example of the parking assist process according to one or more embodiments of the present invention.

FIG. 4C is a third view for describing an example of the parking assist process according to one or more embodiments of the present invention. As the subject vehicle V moves forward, the position of the gaze point moves from G2 to G3. When the position of the gaze point comes to G3, the recommended available parking space Mr changes from the parking space PL4 to the parking space PL5.

FIG. 6B is a second view for describing an example of a display screen in the parking assist process according to one or more embodiments of the present invention. The display screen of FIG. 6B is a display screen when the subject vehicle V is traveling at the position P3 of FIG. 3C. As illustrated in FIG. 6B, when the subject vehicle V is traveling forward, on the display screen of the display 21, the frame indicating the recommended available parking space Mr moves forward and changes to the parking space PL5 in accordance with the movement of the subject vehicle V.

Here, a display form of the recommended available parking space Mr when the subject V vehicle moves while decelerating will be described. As described above, the control device 10 sets the recommended available parking space Mr for the available parking space Me which is closest to the gaze point. The gaze point distance varies in accordance with the vehicle speed of the subject vehicle V.

The description will be made for a case in which the characteristic of the gaze point distance when the vehicle speed increases and the characteristic of the gaze point distance when the vehicle speed decreases follow the characteristic illustrated by the solid line of FIG. 5 rather than the hysteresis characteristic as illustrated in FIG. 5. It is assumed that, in the example of FIG. 4B, the recommended available parking space Mr set when the vehicle speed is Vd is the parking space PL5. In such a case, as the vehicle speed becomes lower than Vd from the state of Vd, the gaze point distance becomes shorter than Yb, and the recommended available parking space Mr therefore changes from the parking space PL5 to another parking space PL4. That is, despite the fact that the subject vehicle travels toward the recommended available parking space Mr which is set before deceleration, the screen of the display 21 shows a movement such that the frame of the recommended available parking space Mr returns below on the screen (in the direction opposite to the travel direction of the subject vehicle, i.e. in the negative direction of the y-axis of FIG. 6A). To prevent such unnatural movement of the recommended available parking space Mr, hysteresis is given to the characteristic of the gaze point distance with respect to the vehicle speed.

With the hysteresis characteristic, the gaze point distance is maintained at Yb when the vehicle speed becomes lower than Vd from the state of Vd. The recommended available parking space Mr therefore remains at the position of the parking space PL5 or moves to the parking space PL6 on the travel direction side of the vehicle from the position of the parking space PL5. This can prevent the unnatural movement of the recommended available parking space Mr.

With regard to the display form of the recommended available parking space Mr on the display screen of the display 21, to prevent the movement in the lateral direction (the positive and negative directions of the x-axis of FIG. 6A), the control device 10 executes the control as below in the control flow of step S104.

Figure 4D:
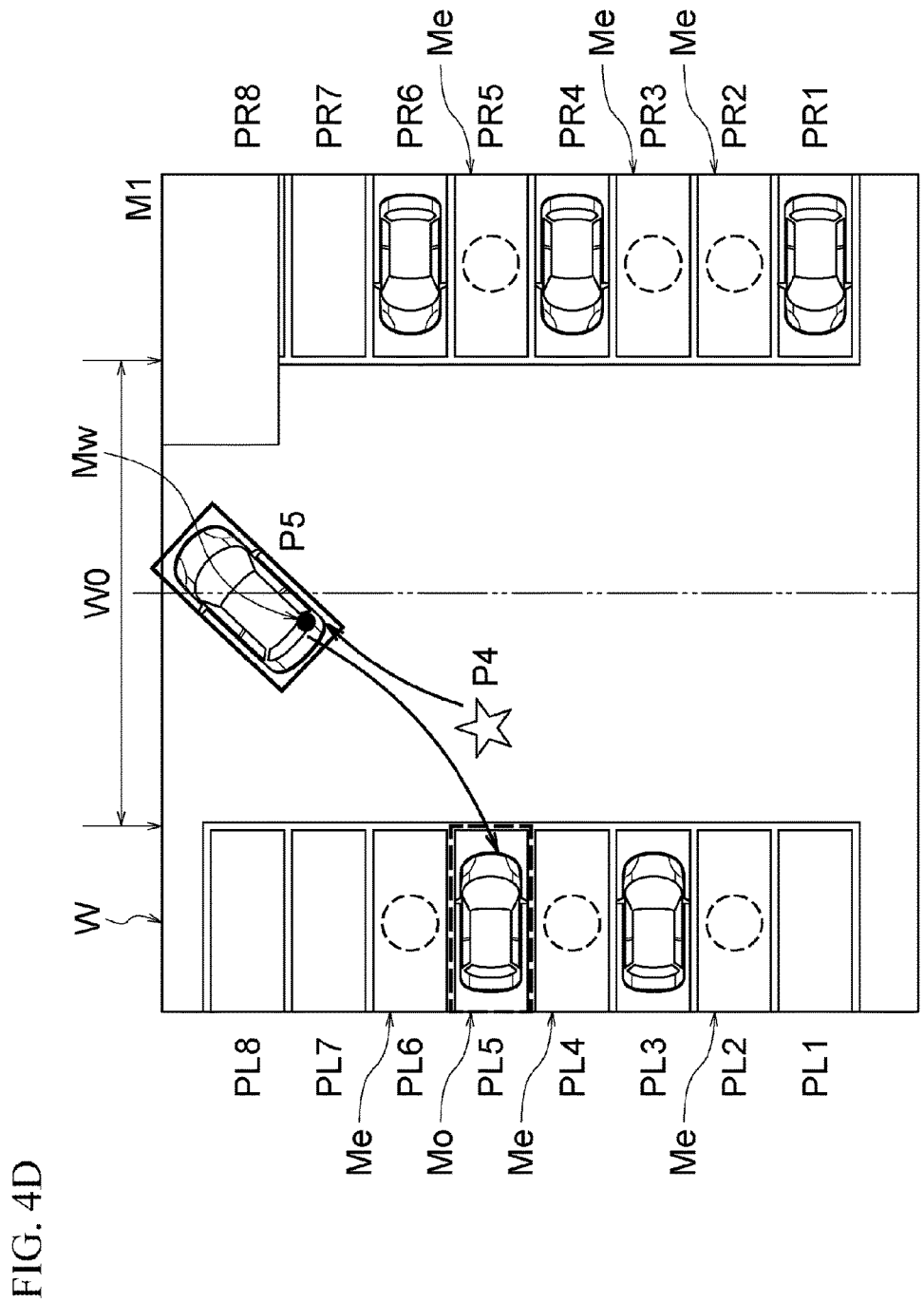
FIG. 4D is a fourth view for describing an example of the parking assist process according to one or more embodiments of the present invention.
Figure 4E:
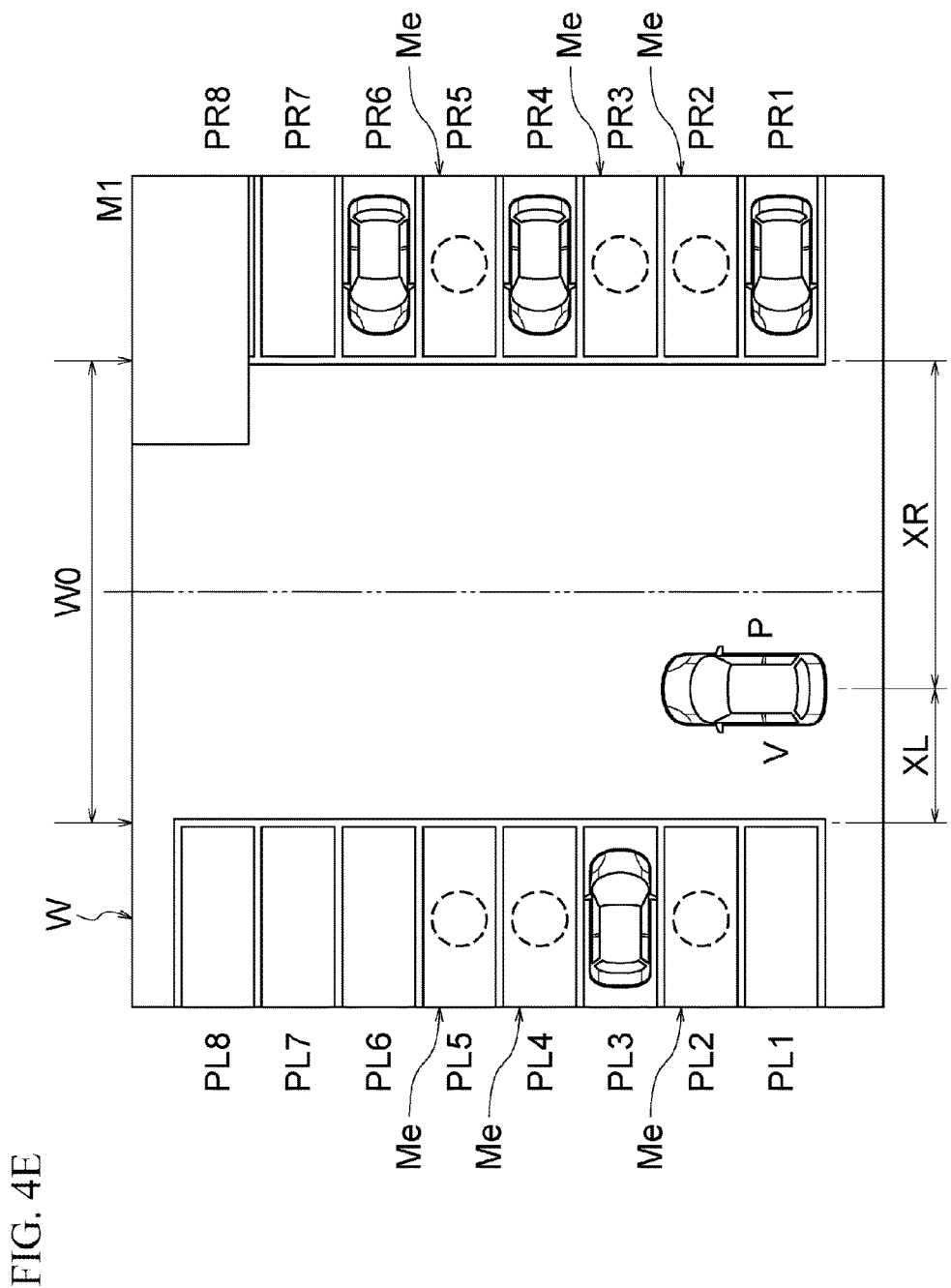
FIG. 4E is a view for describing an example of the parking assist process according to one or more embodiments of the present invention.

FIG. 4E is a view for describing an example of the parking assist process according to one or more embodiments of the present invention. As described above, the recommended available parking space Mr changes its position on the display screen of the display 21 in accordance with the position of the subject vehicle V. For example, in the parking area illustrated in FIG. 4E, it is assumed that the subject vehicle V is traveling between an array of the parking spaces PL1 to PL8 on the left side and an array of the parking spaces PR1 to PR7 on the right side and in the vicinity of the center (corresponding to the dashed-two dotted line of FIG. 4E) in the lateral direction. It is also assumed that, as illustrated in FIG. 4E, a number of parking spaces are empty in the parking area. When the subject vehicle V is traveling on the left side of the center line indicated by the dashed-two dotted line, the position of the gaze point is located on the left side of the center line. On the other hand, when the subject vehicle V is traveling on the right side of the center line indicated by the dashed-two dotted line, the position of the gaze point is located on the right side of the center line. Accordingly, when the subject vehicle V travels along the direction in which the parking spaces are arranged, the position of the subject vehicle V may swing laterally across the center line, and the position of the gaze point may also swing laterally. Since the available parking space Me closest to the gaze point is set as the recommended available parking space Mr, the displayed frame of the recommended available parking space Mr will frequently move right and left. In one or more embodiments of the present invention, control is executed as below to prevent such hunting of the recommended available parking space Mr.

The control device 10 sets a fixed display mode for fixing the display region for the recommended available parking space Mr in accordance with the number of the available parking spaces Me. In the fixed display mode, the region in which the recommended available parking space Mr can be set is fixed to any of the left side and the right side. The control device 10 compares the number of the available parking spaces Me with a predetermined value. When the number of the available parking spaces Me is not smaller than the predetermined value, the control device 10 sets the fixed display mode.

When the fixed display mode is set, the control device 10 sets one of right and left regions as a settable region for the recommended available parking space Mr in accordance with the traveling state of the subject vehicle. Specifically, the control device 10 calculates the distances from the parking spaces located on the sides of the subject vehicle to the subject vehicle as lateral distances (XL, XR). In the example of FIG. 4E, XL represents the lateral distance on the left side and XR represents the lateral distance on the right side. The control device 10 compares XL with XR. When XL is shorter than XR, the control device 10 sets the region on the left side as the settable region for the recommended available parking space Mr. When XR is shorter than XL, the control device 10 sets the region on the right side as the settable region for the recommended available parking space Mr.

After setting the settable region for the recommended available parking space Mr to the right or left, the control device 10 adds a length XHIS that defines a bias to a length (W0/2) to give hysteresis to the setting condition when setting the right or left side with respect to the length of the lateral distance. The length (W0/2) is a length obtained by halving the length of the lateral distance between the left-side parking spaces and the right-side parking spaces. When the left-side region is set as the settable region for the recommended available parking space Mr, the control device 10 compares the left-side lateral distance XL with a length (XHIS+W0/2) to which the bias is added. When the left-side lateral distance XL is longer than the length (XHIS+W0/2), the control device 10 changes the settable region for the recommended available parking space Mr from the left-side region to the right-side region. When the left-side lateral distance XL is not longer than the length (XHIS+W/2), the control device 10 maintains the state in which the left-side region is set as the settable region for the recommended available parking space Mr.

When the left-side region is set as the settable region for the recommended available parking space Mr, the control device 10 compares the left-side lateral distance XL with a length (XHIS+W0/2) to which the bias is added. As illustrated in FIG. 4E, when the left-side lateral distance XL is not longer than the length (XHIS+W/2), the control device 10 maintains the state in which the settable region for the recommended available parking space Mr is set to the left-side region. On the other hand, when the subject vehicle moves to the right side and the right-side lateral distance XR is not longer than the length (XHIS+W/2), the control device 10 changes the settable region for the recommended available parking space Mr from the left-side region to the right-side region. Through this operation, selection between the right side and the left side when set as the settable region can have a hysteresis characteristic with respect to the lateral position of the subject vehicle. For example, when the left-side region is set as the settable region for the recommended available parking space Mr, the recommended available parking space Mr is preferentially displayed on the left-side region as compared with the right side. This makes it possible to suppress the occurrence of hunting of the recommended available parking space Mr on the display screen of the display 21.

When the number of the available parking spaces Me is less than the predetermined value, the control device 10 sets the recommended available parking space Mr without setting the fixed display mode. When the parking area includes few empty parking spaces, prompt presentation of the empty parking spaces to the driver and passengers may be more important than preventing the hunting. Thus, the convenience of the system for the driver and passengers can be improved.

Referring again to FIG. 2, when the subject vehicle V stops while the control flow from step S104 to step S106 is repeatedly executed, the display screen of the display 21 becomes a screen as illustrated in FIG. 6C. FIG. 6C is a third view for describing an example of a display screen in the parking assist process according to one or more embodiments of the present invention. The display screen of FIG. 6C is a display screen when the subject vehicle V stops at the position P3 in FIG. 4C.

As illustrated in the display screen of FIG. 6C, the user finds the messages included in the image 21C and can confirm that selection and input of the target parking space Mo are required.

In step S107, the target parking space Mo is set and presented. In the example of FIG. 6C, the recommended available parking space Mr is displayed at the position of the parking space PL5. When, in this state, the driver or passenger touches the displayed portion of the recommended available parking space Mr, the control device 10 sets the parking space PL5 as the target parking space Mo.

Figure 6D:
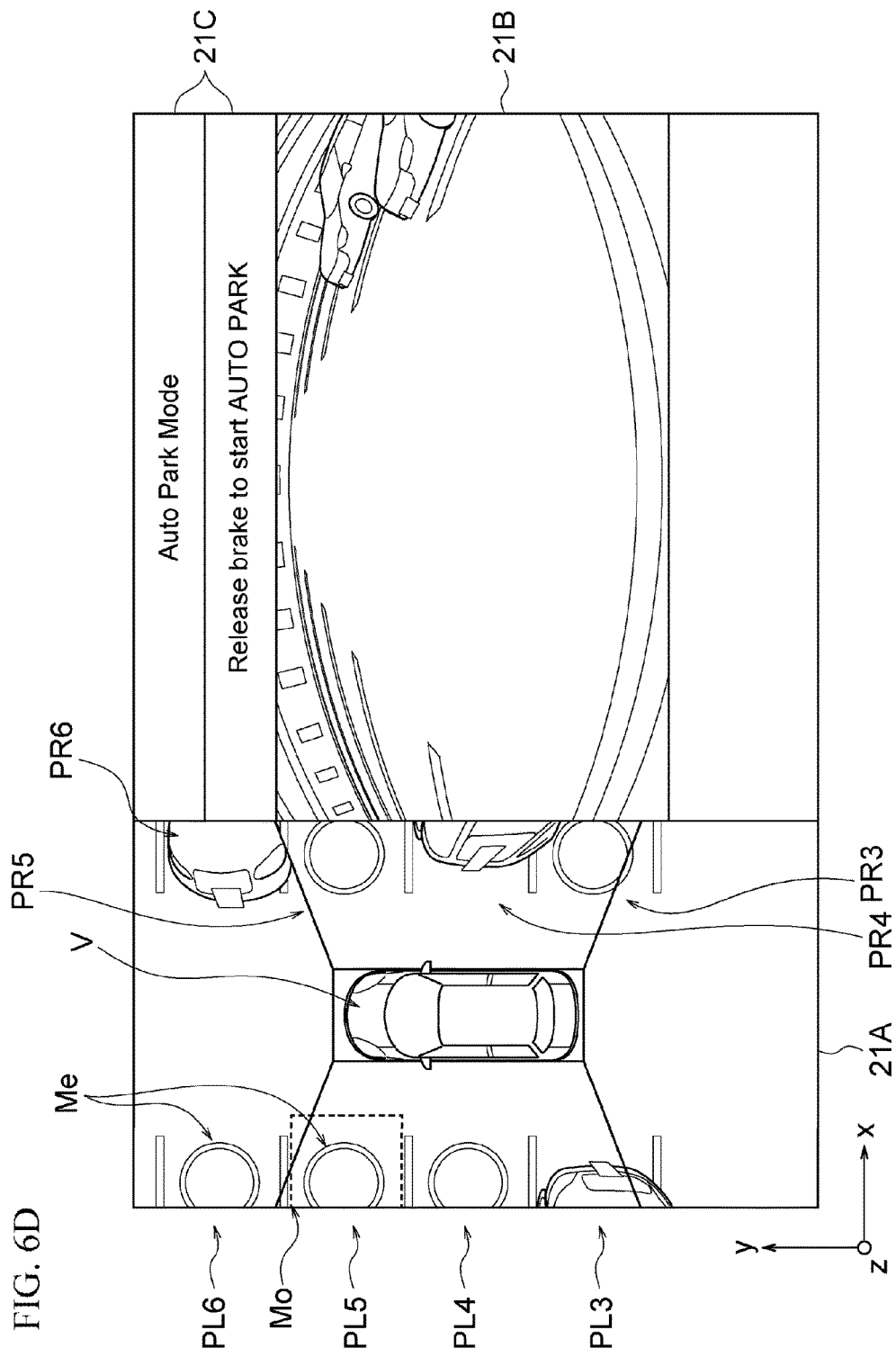
FIG. 6D is a fourth view for describing an example of a display screen in the parking assist process according to one or more embodiments of the present invention.

FIG. 4D is a fourth view for describing an example of the parking assist process according to one or more embodiments of the present invention. FIG. 6D is a fourth view for describing an example of a display screen in the parking assist process according to one or more embodiments of the present invention. The display screen of FIG. 6D is a display screen when the vehicle stops at the position P4 in FIG. 4D. When the parking space PL5 is set as the target parking space Mo, the control device 10 controls the display 21 to display the display screen as illustrated in FIG. 6D thereby to present the target parking space Mo to the driver and passengers. The driver and passengers find the messages included in the image 21C and can confirm that the automated driving can be started.

Referring again to FIG. 2, in step S108, the control device 10 calculates a travel route for moving the subject vehicle to the target parking space Mo. The user designates the parking space PL5, which is presented as the recommended available parking space Mr as illustrated in FIG. 4C, as the target parking space Mo. The user touches the parking space PL5, which is displayed on the touch panel-type display 21, to designate this parking space as the target parking space Mo. Through this operation, the target parking space Mo is determined. As illustrated in FIG. 4D, the subject vehicle V moves to the position P4 on the side of the target parking space PL5 (Mo). This position P4 is the automated parking start position for the subject vehicle.

The control device 10 calculates a travel route on the basis of the positional relationship between the position P4 of the subject vehicle V at which the parking maneuver (movement) is started and the position of the target parking space Mo. Although not particularly limited, the control device 10 calculates the travel route to include two curves. The first curve lies from the stop position of the subject vehicle V, that is, the start position at which the parking assist is started, to the turning position P5 at which the turn for parking is performed. The second curve lies from the turning position P5 to the target parking space Mo. The control device 10 calculates the travel route corresponding to each of the right-angle parking, the parallel parking, and the angle parking illustrated in FIGS. 7A-7C, respectively. In one or more embodiments of the present invention, the travel route is calculated, but the present invention is not limited to this. In an alternative embodiment, a travel route corresponding to the type of the parking space is stored in a memory (ROM), and the travel route may be read out when parking. The parking mode (such as right-angle parking, parallel parking, and angle parking) may be selected by the user of the subject vehicle V.

The control device 10 reads travel routes corresponding to the selected parking mode and calculates a travel route on the basis of the relationship between the position of the subject vehicle V when starting the automated parking process and the position of the target parking space Mo. When the user presses the previously-described deadman switch under the automated parking mode, the control device 10 controls the vehicle controller 30 to execute the process of moving the subject vehicle to the target parking space Mo on the calculated travel route.

In step S109, the parking assist apparatus 100 according to one or more embodiments of the present invention executes the parking assist process or the automated parking process. The parking assist apparatus 100 according to one or more embodiments of the present invention controls the operation of the drive system 40 via the vehicle controller 30 so that the subject vehicle moves along the travel route.

FIG. 6E is a fifth view for describing an example of a display screen in the parking assist process according to one or more embodiments of the present invention. When the automated driving is started, the display screen of the display 21 becomes a screen as illustrated in FIG. 6E, and the subject vehicle V moves forward. At this time, the image 21C is displayed with messages informing that the subject vehicle V is moving forward by the automated driving and that the driver and passengers should gaze around the subject vehicle V. The automated driving control executed by the parking assist apparatus 100 will be described below.

The parking assist apparatus 100 calculates command signals to the drive system 40 of the subject vehicle, such as an EPS motor, while feeding back the output value of the steering angle sensor 50 of the steering apparatus so that the travel trajectory of the subject vehicle V coincides with the calculated travel route, and sends the command signals to the drive system 40 or to the vehicle controller 30 which controls the drive system 40.

The parking assist apparatus 100 according to one or more embodiments of the present invention includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the vehicle and the vehicle speed sensor 60 and other sensors of the vehicle, via the vehicle controller 30.

The drive system 40 according to one or more embodiments of the present invention allows the subject vehicle V to park into the target parking space Mo by driving based on the control command signals acquired from the parking assist apparatus 100. The steering apparatus according to one or more embodiments of the present invention is a drive mechanism that moves the subject vehicle V in the right and left directions. The EPS motor included in the drive system 40 drives the power steering mechanism of the steering apparatus on the basis of the control command signals acquired from the parking assist apparatus 100 to control the steering amount and assists the operation when moving the subject vehicle V to the target parking space Mo. The content of the parking assist and the scheme of operation are not particularly limited, and schemes known at the time of filing of this application can be appropriately applied.

As illustrated in FIG. 4D, when the parking assist apparatus 100 according to one or more embodiments of the present invention controls the subject vehicle V to move to the target parking space Mo along the travel route calculated based on the movement start position P3 of the subject vehicle V and the position of the target parking space Mo, the operation of the accelerator/brake is automatically controlled on the basis of the designated control vehicle speed (set vehicle speed), and the steering operation of the steering apparatus is also automatically controlled in accordance with the vehicle speed. That is, during the parking assist according to one or more embodiments of the present invention, the steering operation of the steering apparatus and the accelerator/brake operation are automatically performed. It is also possible to perform a parking process by remote control that includes transmitting a setting command for the target parking space Mo, a parking process start command, a parking suspension command, etc. to the vehicle with no driver therein from the outside and performing the parking.

As will be understood, it is also possible for the user to operate the accelerator/brake, and only the steering operation is automated. In this case, the parking assist apparatus 100 controls the drive system 40 on the basis of the set vehicle speed, which is preliminarily calculated, and controls the steering apparatus of the vehicle on the basis of the set steering angle, which is also preliminarily calculated, so that the subject vehicle V follows the travel route G2, G3 to move.

The above is the basic control content in the parking assist apparatus 100 according to one or more embodiments of the present invention.

Figure 8:
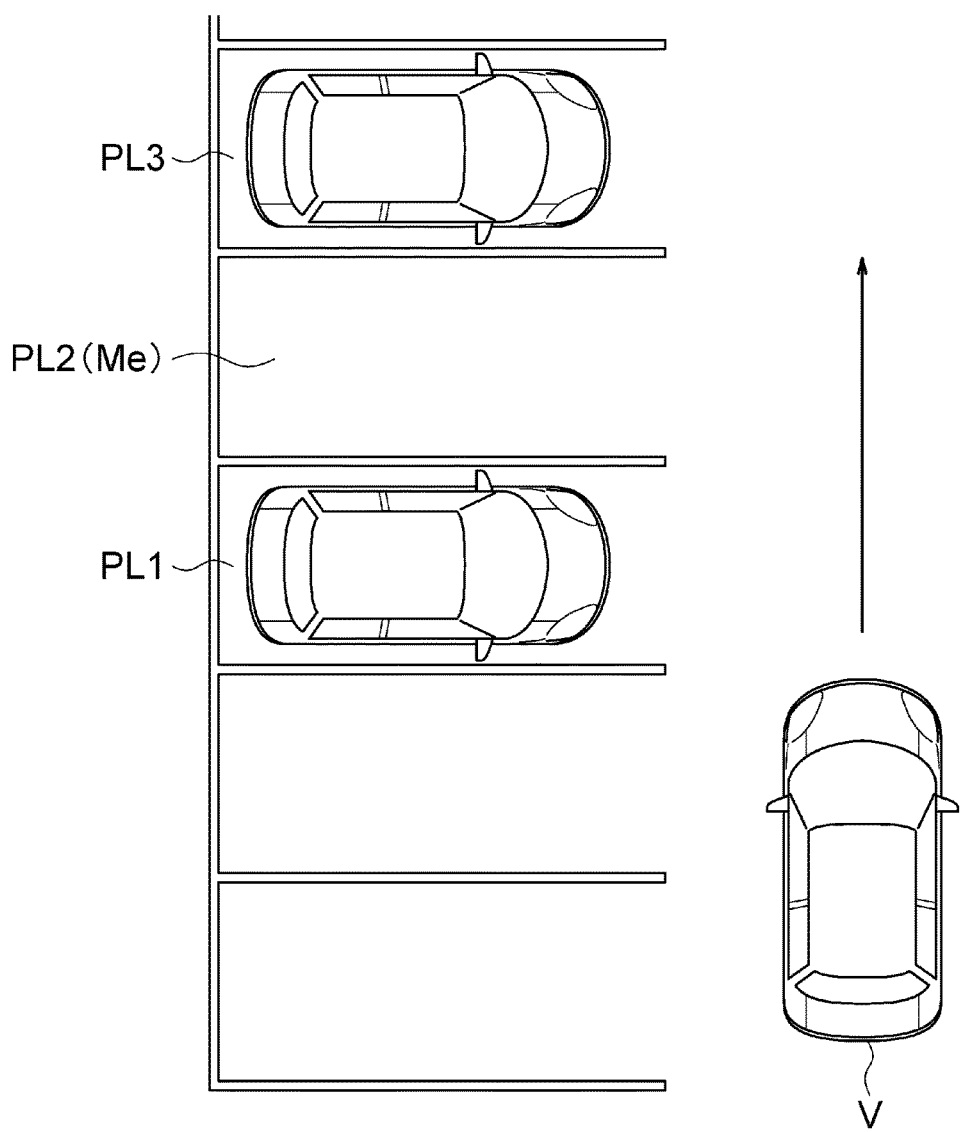
FIG. 8 is a plan view illustrating a state of the subject vehicle detecting an available parking space.

A first embodiment of the detection process for available parking spaces (empty parking spaces) Me in one or more embodiments of the present invention will be described below. FIG. 8 is a plan view illustrating a state of the subject vehicle V when detecting the available parking spaces Me. As illustrated in this figure, when the subject vehicle V is moving forward through a pathway in the vicinity of parking spaces PLn (n=integer), the control device 10 detects the available parking spaces Me from among the parking spaces PLn.

The control device 10 has a function of executing the detection process for the available parking spaces Me. This function includes functions of executing a frame line detection process, a parking space detection process, and an empty/parking determination process. In the frame line detection process, as described above, frame lines are detected on the basis of the overhead image generated by the image processing device 2. In the parking space detection process, parking spaces PLn that are defined by the frame lines detected in the frame line detection process are detected.

For example, a conceivable method of determining empty/parking in a determination target parking space PL2 includes measuring the length of a frame line on the far side of the determination target parking space PL2 and making a determination on the basis of the length of the frame line on the far side. The condition for this method is that the frame line on the far side of the determination target parking space PL2 is detected. However, depending on the parking situation, it may be difficult to detect the frame line. For example, when a parked vehicle exists in a parking space adjacent to the determination target parking space PL2 (the near-side parking space and the far-side parking space will be respectively referred to as parking spaces PL1 and PL2, hereinafter), the shadow of the parked vehicle overlaps with a frame line of the determination target parking space PL2, so that a situation may occur in which the frame line on the far side is not detected. Other possible cases include a situation in which, depending on the parking lot, detection of frame lines may be difficult due to poor lighting especially at night.

In the present embodiment, therefore, when a parked vehicle exists in the far-side adjacent parking space PL3, the following method is used to execute determination of empty/parking for the determination target parking space PL2 which located at the near side and adjacent to the parking space PL3.

In the empty/parking detection process according to the present embodiment, the parking situation of a parking space is detected using the parking situation detector according to the present invention. The parking situation detector used in this empty/parking detection process may be a camera, a ranging device such as radar and sonar, or the like. It suffices that the detector can detect the length of an object. In the empty/parking detection process, the parking state of a parking space is determined from the parking situation information acquired by the parking situation detector.

Figure 9:
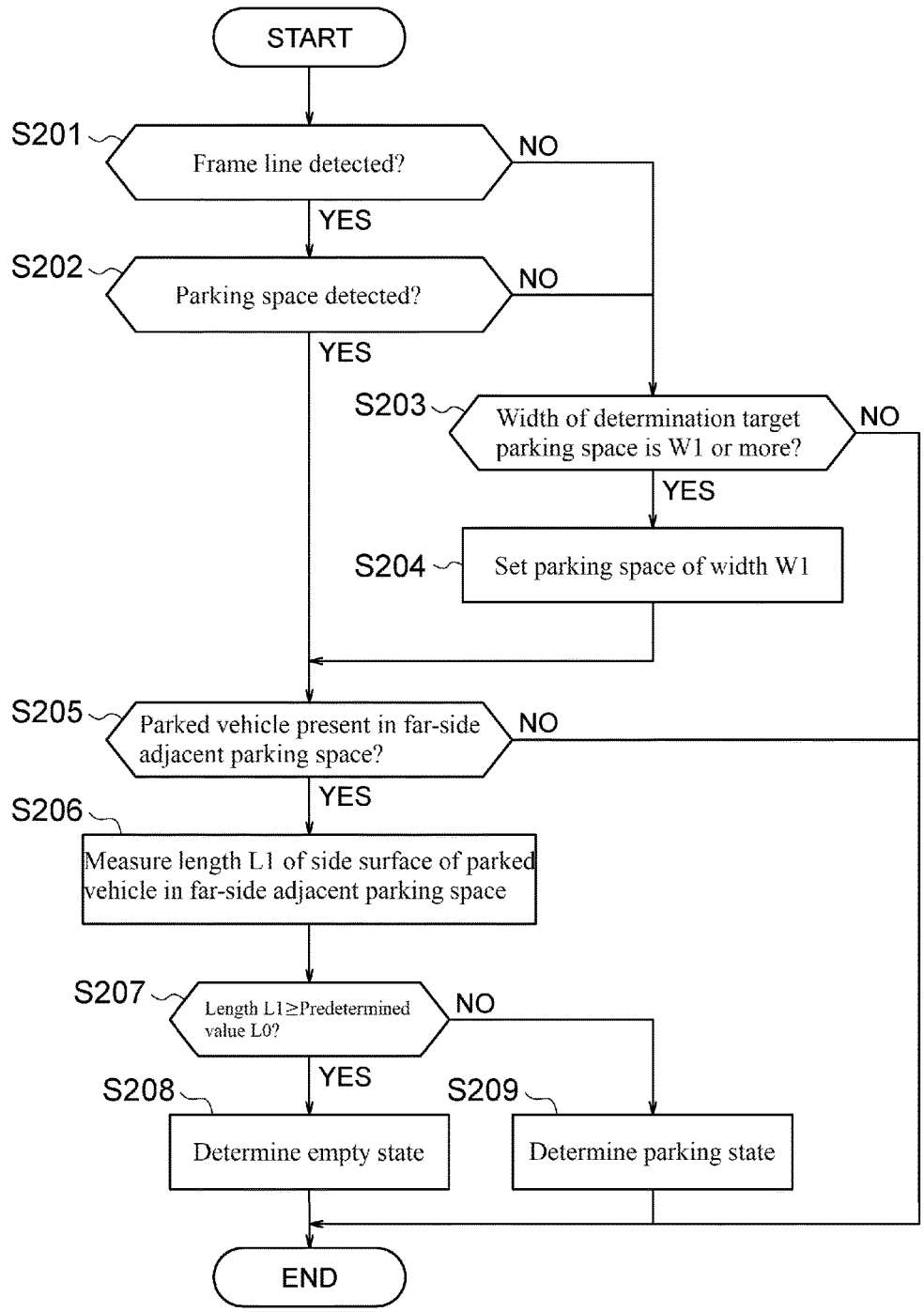
FIG. 9 is a flowchart illustrating the procedure in a first embodiment of the detection process executed by a control device to detect an available parking space.

FIG. 9 is a flowchart illustrating a procedure of the detection process for available parking spaces Me. The detection process is executed by the control device 10. The processing routine illustrated in this flowchart is executed in a parking lot at a predetermined period (e.g. every 10 msec).

In step S201, the control device 10 determines whether or not frame lines on the far side and near side of the determination target parking space PL2 are detected. When, in step S201, a determination is made that frame lines on the far side and near side are detected, the routine proceeds to step S202, while when a determination is made that frame lines on the far side and near side are not detected, the routine proceeds to step S203.

In step S202, the control device 10 determines whether or not the determination target parking space PL2 is detected on the basis of the positions and angles of the detected far-side and near-side frame lines. When, in step S202, a determination is made that the determination target parking space PL2 is detected, the routine proceeds to step S205, while when a determination is made that the determination target parking space PL2 is not detected, the routine proceeds to step S203.

In step S203, the control device 10 determines whether or not the width of the determination target parking space PL2 is not less than W1. Examples of the method of setting this predetermined width W1 include a method of setting the width of a parking space PLn on the near side in the travel direction from the determination target parking space PL2, as the predetermined width W1. Otherwise, the predetermined width W1 may be acquired to be set from an external server or via road-to-vehicle communication or vehicle-to-vehicle communication or may also be set on the basis of the size of a vehicle, or a different value may be set for each vehicle. Then, the predetermined width W1 thus set is used to determine whether or not the distance between the parked vehicle existing in the near-side adjacent parking space PL1 and the parked vehicle existing in the far-side adjacent parking space PL3 is not less than the predetermined width W1 or whether or not the distance between the parked vehicle existing in the far-side adjacent parking space PL3 and the near-side frame line of the determination target parking space PL2 is not less than the predetermined width W1.

When, in step S203, a determination is made that the width of the determination target parking space PL2 is not less than the predetermined width W1, the routine proceeds to step S204. When, in step S203, a determination is made that the width of the determination target parking space PL2 is less than the predetermined width W1, the processing routine is ended.

In step S204, the control device 10 sets the determination target parking space PL2 having the predetermined width W1 or more. Step S204 is followed by step S205.

In step S205, the control device 10 determines whether or not a parked vehicle exists in the far-side adjacent parking space PL3. In the present embodiment, when a parked vehicle exists in the far-side adjacent parking space PL3, the parked vehicle in the far-side adjacent parking space PL3 is utilized to determine the parking situation of the determination target parking space PL2. To this end, this step is provided to determine whether or not the parking situation of the determination target parking space PL2 can be determined. When a parked vehicle exists in the far-side adjacent parking space PL3, the routine proceeds to step S206. When a parked vehicle does not exist in the far-side adjacent parking space PL3, the processing routine is ended.

In step S206, the control device 10 measures a length L1 of the side surface of the parked vehicle in the far-side adjacent parking space PL3 (the side surface refers to a surface located on the side of the determination target parking space PL2). In the present embodiment, the measurement of the length L1 of the vehicle side surface is executed by analyzing an image captured by a camera 1. Here, the length L1 is not an actual distance of the length of the vehicle side surface and is a length of the vehicle side surface displayed on the image captured by the camera 1. In another embodiment, the actual distance of the length of the vehicle side surface may be employed. The example of using the camera 1 is mentioned as an example of measuring the length L1 of the vehicle side surface in the far-side adjacent parking space PL3, but the present invention is not limited to this, and a sonar or radar, for example, may be used.

Step S206 is followed by step S207 in which the control device 10 determines whether or not the measured length L1 of the side surface of the parked vehicle in the far-side adjacent parking space PL3 is not less than a predetermined value L0. This predetermined value L0 will be described later.

When the length L1 satisfies the condition of being not less than the predetermined value L0, in step S208, the control device 10 determines that the determination target parking space PL2 is in an empty state. On the other hand, when the length L1 does not satisfy the condition of being not less than the predetermined value L0, in step S208, the control device 10 determines that the determination target parking space PL2 is in a parking state.

Figure 10:
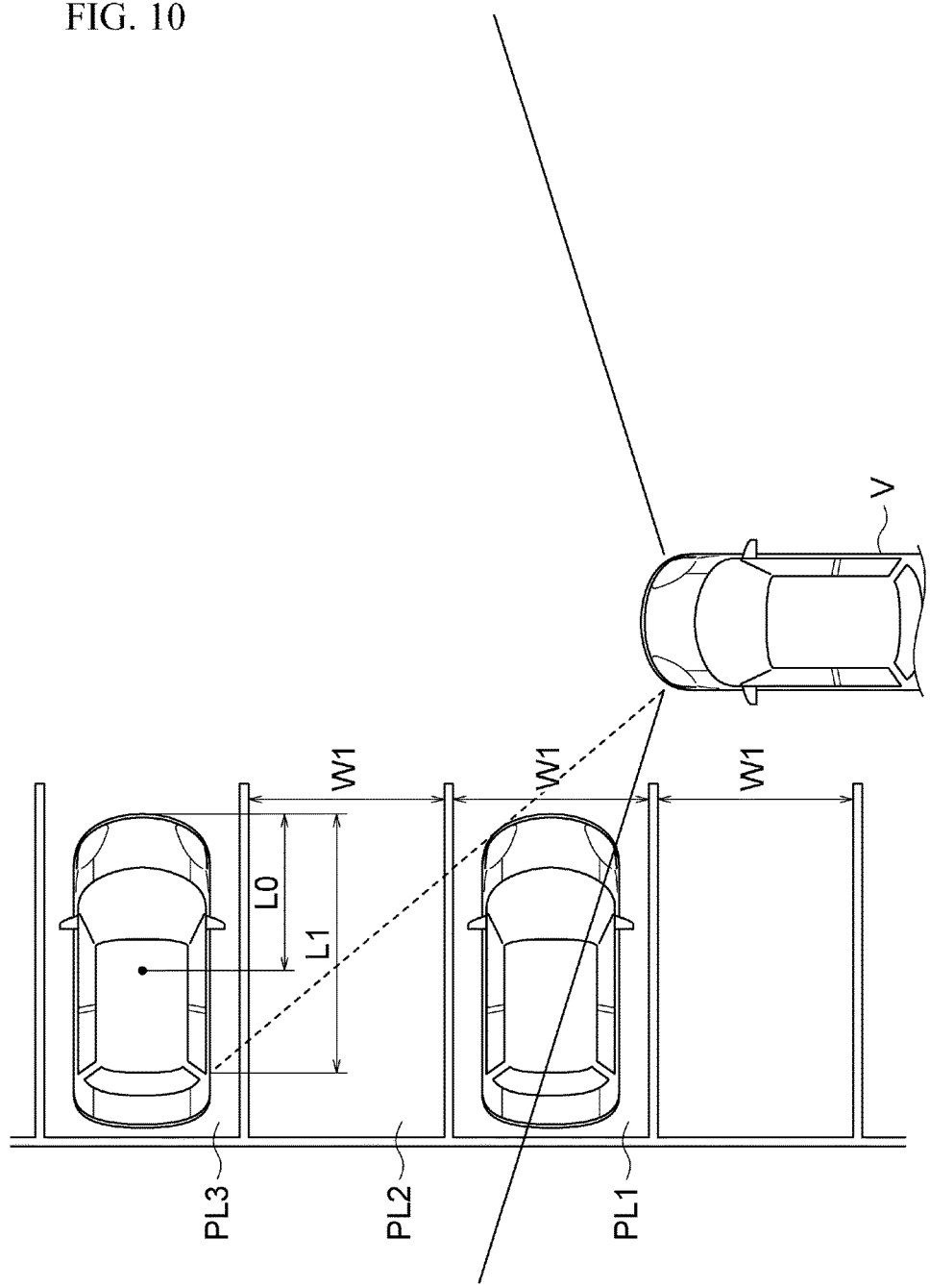
FIG. 10 is a plan view illustrating a situation in which parked vehicles exist in a far-side adjacent parking space and a near-side adjacent parking space and no parked vehicle exists in a determination target parking space.
Figure 11:
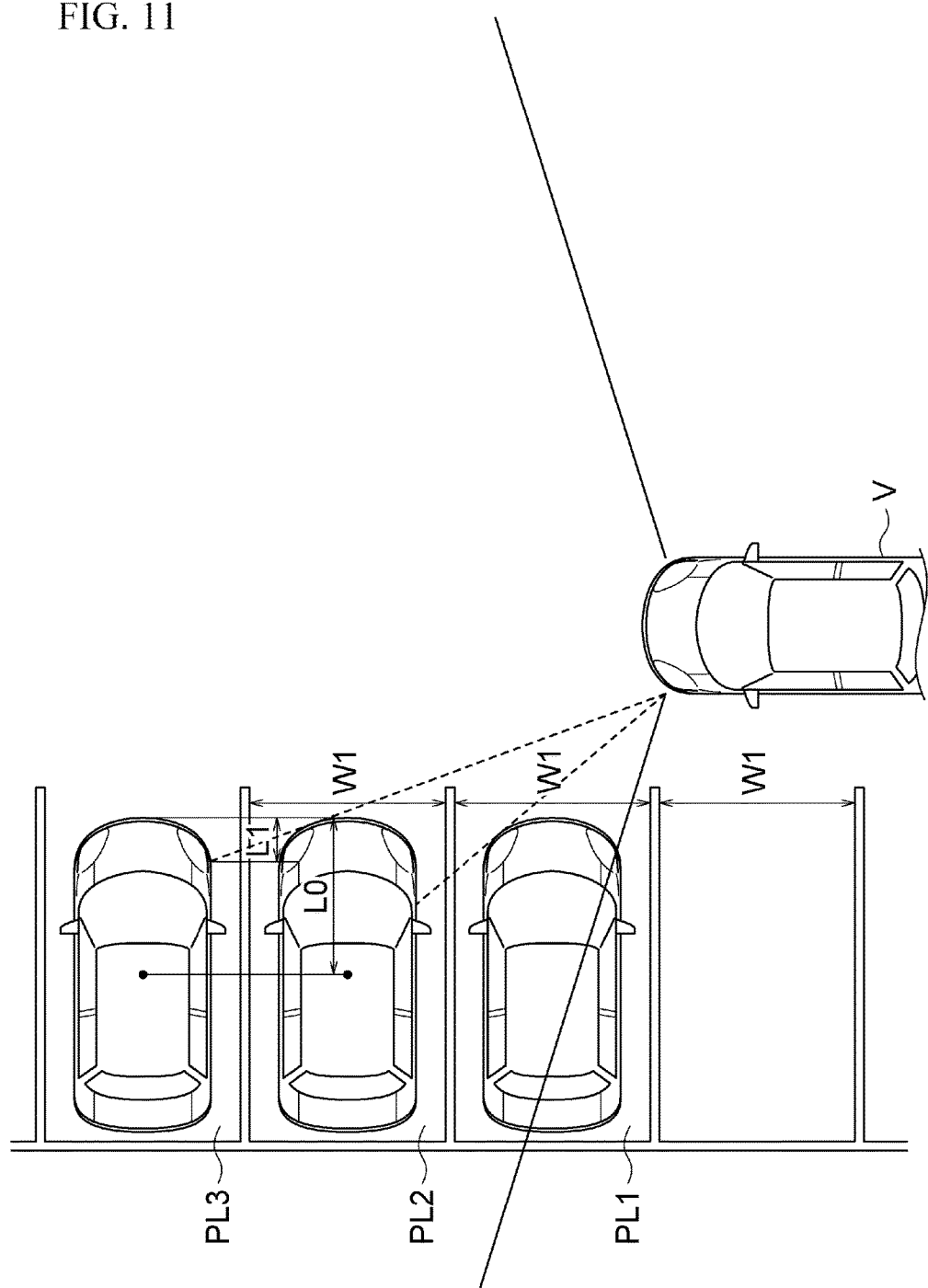
FIG. 11 is a plan view illustrating a situation in which parked vehicles exist in the far-side adjacent parking space and the near-side adjacent parking space and a parked vehicle exists also in the determination target parking space.

Here, as illustrated in FIGS. 10 and 11, the situation in which parked vehicles exist in the far-side adjacent parking space PL3 and near-side adjacent parking space PL1 will be discussed. In this situation, when no parked vehicle exists in the determination target parking space PL2 as illustrated in FIG. 10, the entire front portion and a part of the rear portion of the side surface of the parked vehicle in the far-side adjacent parking space PL3 appear in the image capture range of the camera 1. On the other hand, in this situation, when a parked vehicle exists in the determination target parking space PL2 as illustrated in FIG. 11, the entire rear portion of the side surface of the parked vehicle in the far-side adjacent parking space PL3 is hidden behind the parked vehicle in the determination target parking space PL2 and does not appear in the image capture range of the camera 1.

In the present embodiment, therefore, when the range extending from the front end part to the rear portion of the side surface of the parked space in the far-side adjacent parking space PL3 is displayed in the image captured by the camera 1, a determination is made that the determination target parking space PL2 is in an empty state. To this end, the above-described predetermined value L0 is set, for example, to about ½ of the length of an average vehicle, to about ½ of the length of the frame line, or the like. Here, the predetermined value L0 may be set in accordance with the angle between the subject vehicle V and the determination target parking space PL2. That is, as the angle between the subject vehicle V and the determination target parking space increases, the predetermined value L0 may be set larger.

The predetermined value L0 may be a fixed value or may also be a variable value. When the predetermined value L0 is a variable value, it may be determined in accordance with the positional relationship between the determination target parking space PL2 and the subject vehicle, or may also be variable during traveling. When the predetermined value L0 is determined in accordance with the positional relationship between the determination target parking space PL2 and the subject vehicle V, the predetermined value L0 is set smaller as the distance between the determination target parking space PL2 and the subject vehicle V is longer in the vehicle travel direction, for example, or the predetermined value L0 is set smaller as the distance between the determination target parking space PL2 and the subject vehicle V is shorter in the direction perpendicular to the vehicle travel direction. This allows for more accurate detection of the parking situation of the determination target parking space PL2.

Figure 12:
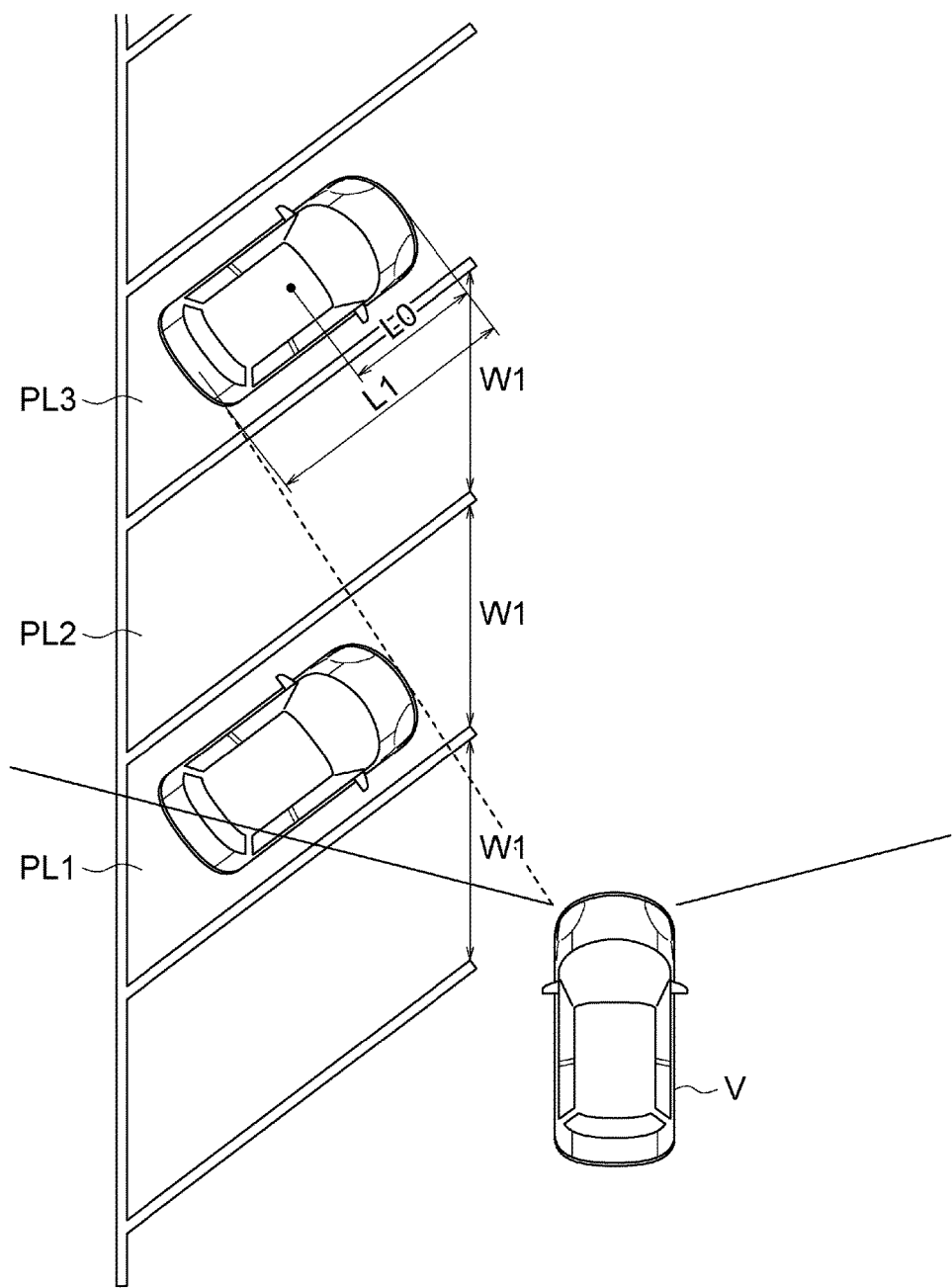
FIG. 12 is a plan view illustrating a situation of a parking lot of an angle parking scheme in which parked vehicles exist in a far-side adjacent parking space and a near-side adjacent parking space and no parked vehicle exists in a determination target parking space.
Figure 13:
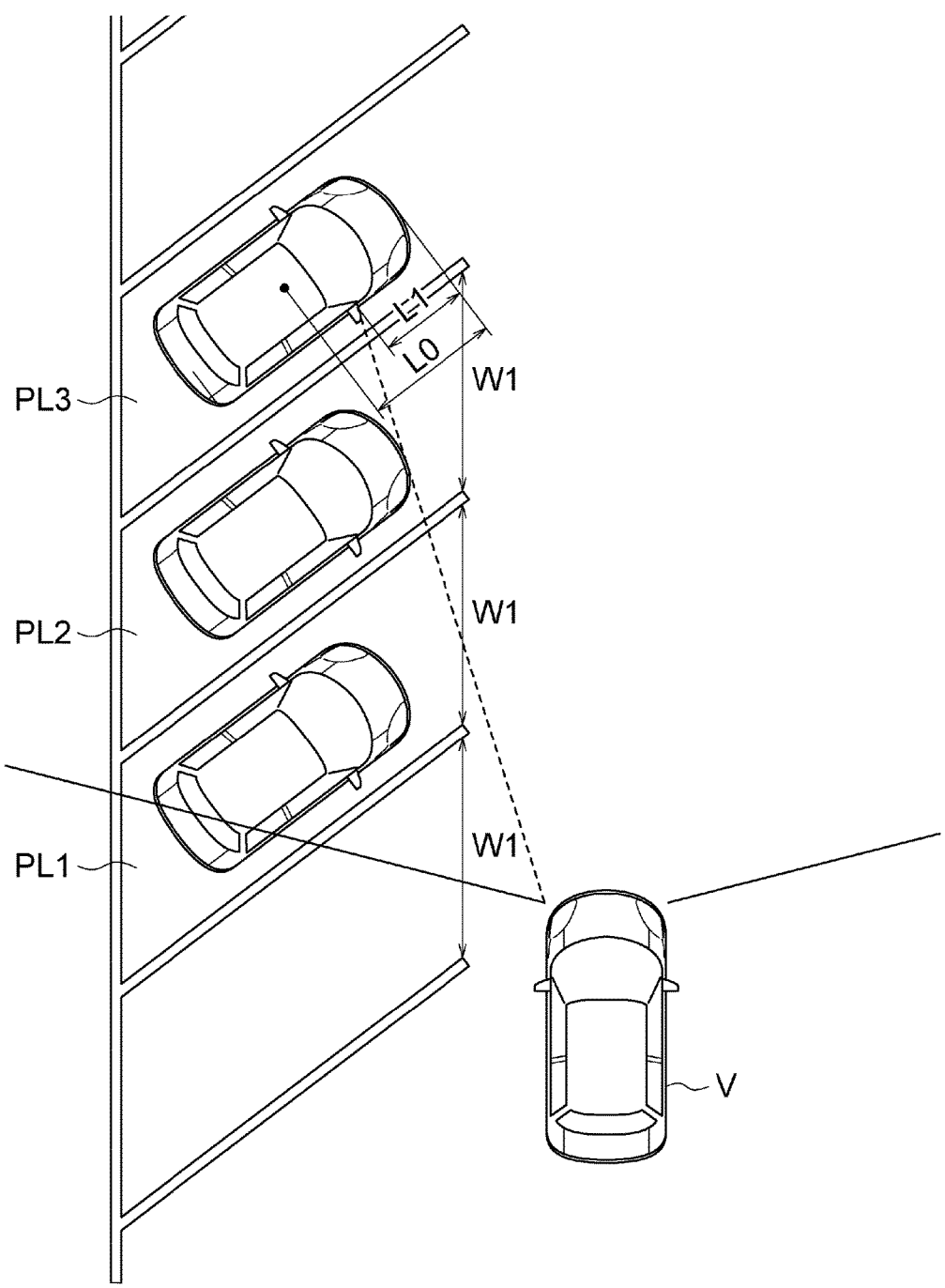
FIG. 13 is a plan view illustrating a situation of the parking lot of the angle parking scheme in which parked vehicles exist in the far-side adjacent parking space and the near-side adjacent parking space and a parked vehicle exists also in the determination target parking space.
Figure 14:
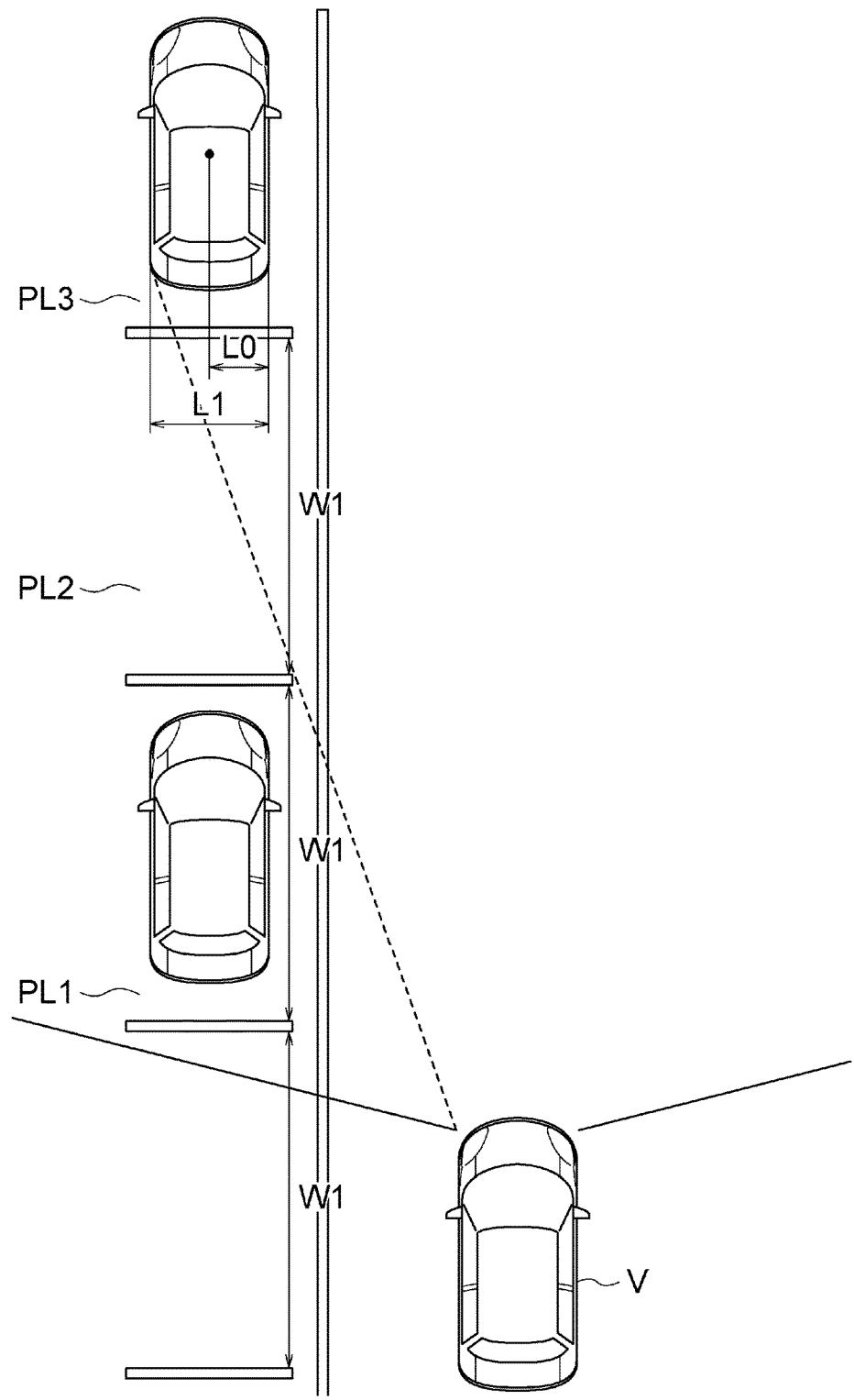
FIG. 14 is a plan view illustrating a situation of a parking lot of a parallel parking scheme in which parked vehicles exist in a far-side adjacent parking space and a near-side adjacent parking space and no parked vehicle exists in a determination target parking space.
Figure 15:
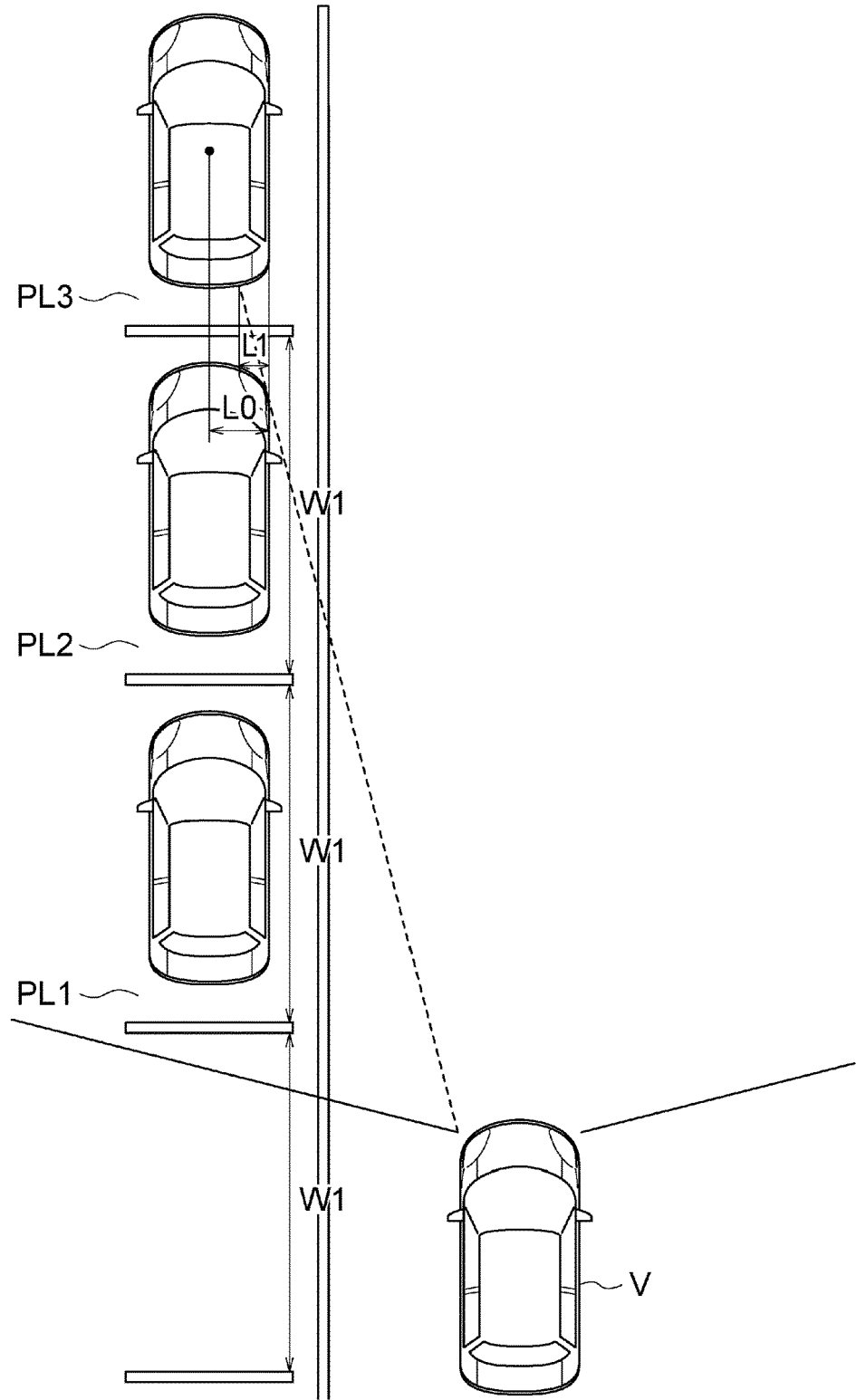
FIG. 15 is a plan view illustrating a situation of the parking lot of the parallel parking scheme in which parked vehicles exist in the far-side adjacent parking space and the near-side adjacent parking space and a parked vehicle exists also in the determination target parking space.

Discussion will then be made for the case of the angle parking scheme as illustrated in FIGS. 12 and 13 and the parallel parking scheme as illustrated in FIGS. 14 and 15. As illustrated in FIGS. 12 and 13, the same result is obtained in the case of the angle parking scheme (e.g. 30 degrees) as in the case of the right angle parking scheme. That is, in the situation in which a parked vehicle exists in the far-side adjacent parking space PL3 as illustrated in FIG. 12, when the determination target parking space PL2 is in an empty state, the length L1 of the side surface of the parked vehicle in the far-side adjacent parking space PL3 (the side surface refers to a surface located on the side of the determination target parking space PL2), which appears in the image capture range of the camera 1, is longer than the predetermined value L0. On the other hand, in the situation as illustrated in FIG. 13, when the determination target parking space PL2 is in a parking state, the length L1 of the side surface of the parked vehicle in the far-side adjacent parking space PL3, which appears in the image capture range of the camera 1, is shorter than the predetermined value L0.

In the situation in which a vehicle parked forward exists in the far-side adjacent parking space PL3, when no parked vehicle exists in the determination target parking space PL2, a part of the rear portion and a part of the front portion of the side surface of the parked vehicle in the far-side adjacent parking space PL3 appear in the image capture range of the camera 1. On the other hand, in this situation, when a parked vehicle exists in the determination target parking space PL2, the front portion of the side surface of the parked vehicle in the far-side adjacent parking space PL3 is hidden behind the parked vehicle in the determination target parking space PL2 and does not appear in the image capture range of the camera 1.

That is, in the case of the right angle or angle parking scheme, the length of the side surface of the parked vehicle in the far-side adjacent parking space PL3 is the same when displayed in the image captured by the camera 1 regardless of the direction of the parked vehicle, and the present embodiment can also be applied to the forward parking.

As illustrated in FIGS. 14 and 15, the same result is obtained in the case of the parallel parking scheme as in the case of the right angle parking scheme. That is, in the situation in which a parked vehicle exists in the far-side adjacent parking space PL3 as illustrated in FIG. 14, when the determination target parking space PL2 is in an empty state, the length L1 of the rear surface of the parked vehicle in the far-side adjacent parking space PL3 (the rear surface refers to a surface located on the side of the determination target parking space PL2), which appears in the image capture range of the camera 1, is longer than a predetermined value L0 (e.g. about ½ of the vehicle width of an average vehicle or about ½ of the length of the frame line). On the other hand, in the situation as illustrated in FIG. 15, when the determination target parking space PL2 is in a parking state, the length L1 of the rear surface of the parked vehicle in the far-side adjacent parking space PL3, which appears in the image capture range of the camera 1, is shorter than the predetermined value L0.

Thus, in the present embodiment, in the case of the right-angle parking scheme, the control device 10 compares the measured length L1 of the side surface of the parked vehicle in the far-side adjacent parking space PL3 with the predetermined value L0, such as about ½ of the length of an average vehicle. When the measured length L1 satisfies the condition of being not less than the predetermined value L0, the control device 10 determines that the determination target parking space PL2 is in an empty state. When the measured length L1 does not satisfy the condition of being not less than the predetermined value L0, the control device 10 determines that the determination target parking space PL2 is in a parking state. In the present embodiment, in the case of the parallel parking scheme, the control device 10 compares the measured length L1 of the rear surface of the parked vehicle in the far-side adjacent parking space PL3 with the predetermined value L0, such as about ½ of the vehicle width of an average vehicle. When the measured length L1 satisfies the condition of being not less than the predetermined value L0, the control device 10 determines that the determination target parking space PL2 is in an empty state. When the measured length L1 does not satisfy the condition of being not less than the predetermined value L0, the control device 10 determines that the determination target parking space PL2 is in a parking state.

As a result, empty/parking of the determination target parking space PL2 can be accurately determined regardless of whether or not a parked vehicle exists in the near-side adjacent parking space PL1 and regardless of whether or not a frame line of the determination target parking space PL2 can be detected.

Moreover, in the present embodiment, the control device 10 determines whether or not a parking space adjacent to the far-side adjacent parking space PL3 exists on the near side, provided that the parking space has a width that is not less than a predetermined width W1 of parking spaces PLn located on the near side of the far-side adjacent parking space PL3. When such a parking space exists, the control device 10 sets the parking space as a determination target parking space PL2 having the predetermined width W1 or more. Through this operation, the determination target parking space PL2 can be detected regardless of whether or not a frame line of the determination target parking space PL2 can be detected, and empty/parking of the determination target parking space PL2 can be determined.

Figure 16:
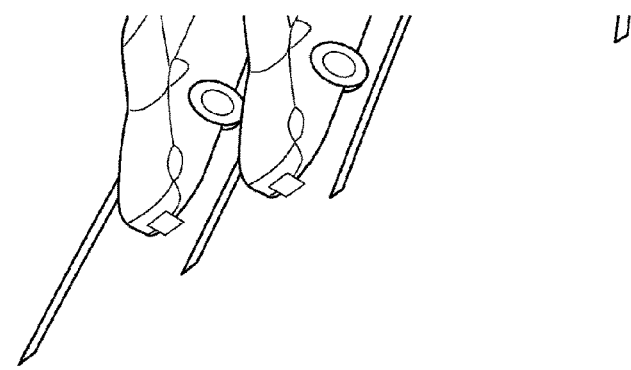
FIG. 16 is a view illustrating a captured image that displays a situation in which parked vehicles exist in a far-side adjacent parking space and a near-side adjacent parking space and no parked vehicle exists in a determination target parking space.
Figure 16:
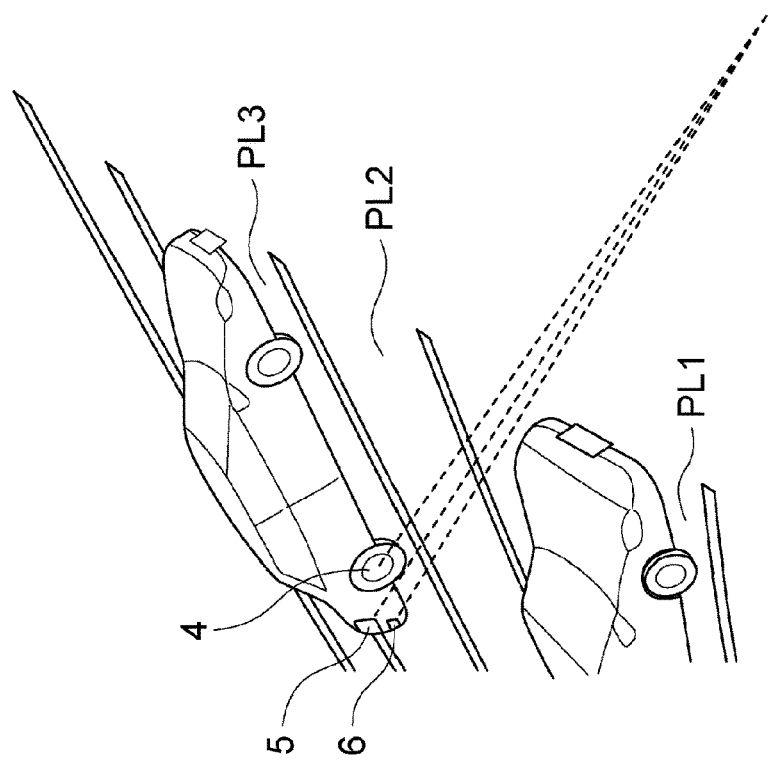
Figure 17:
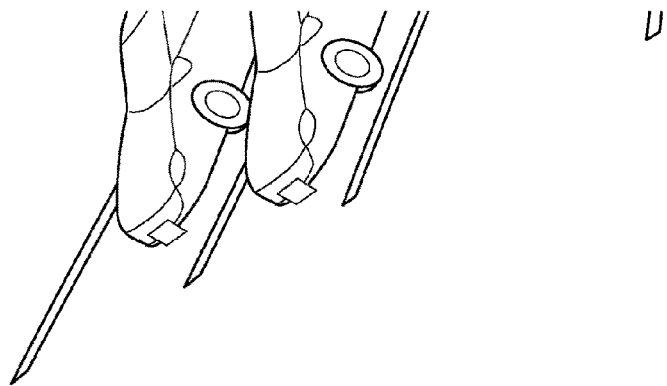
FIG. 17 is a view illustrating a captured image that displays a situation in which parked vehicles exist in the far-side adjacent parking space and the near-side adjacent parking space and a parked vehicle exists also in the determination target parking space.
Figure 17:
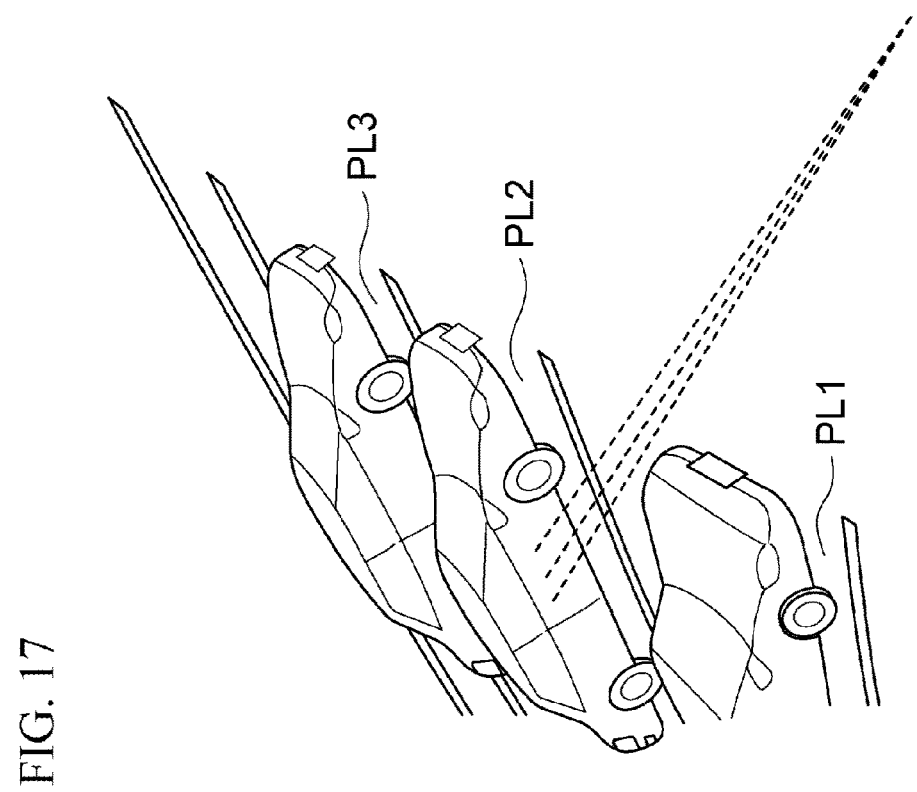

A second embodiment of the detection process for available parking spaces Me will be described. The detection process is executed by the control device 10. FIG. 16 and FIG. 17 are views illustrating the images captured by the camera 1. The captured image illustrated in FIG. 16 represents the display of a situation in which the determination target parking space PL2 is in an empty state and parked vehicles exist in the far-side adjacent parking space PL3 and the near-side adjacent parking space PL1. In this situation, the side surface of the parked vehicle in the far-side adjacent parking space PL3 appears in the image capture range of the camera 1. In particular, in this situation, the rear wheel 4, the rear lamp 5, and the reflector 6 existing on the rear portion of the side surface of the parked vehicle in the far-side adjacent parking space PL3 appear in the image capture range of the camera 1.

On the other hand, the captured image illustrated in FIG. 17 represents the display of a situation in which parked vehicles exist not only in the far-side adjacent parking space PL3 and the near-side adjacent parking space PL1 but also in the determination target parking space PL2. In this situation, the rear portion of the side surface of the parked vehicle in the far-side adjacent parking space PL3 is hidden behind the parked vehicle in the determination target parking space PL2, and the rear wheel 4, the rear lamp 5, and the reflector 6 existing on the rear portion of the side surface of the parked vehicle in the far-side adjacent parking space PL3 do not appear in the image capture range of the camera 1.

Figure 18:
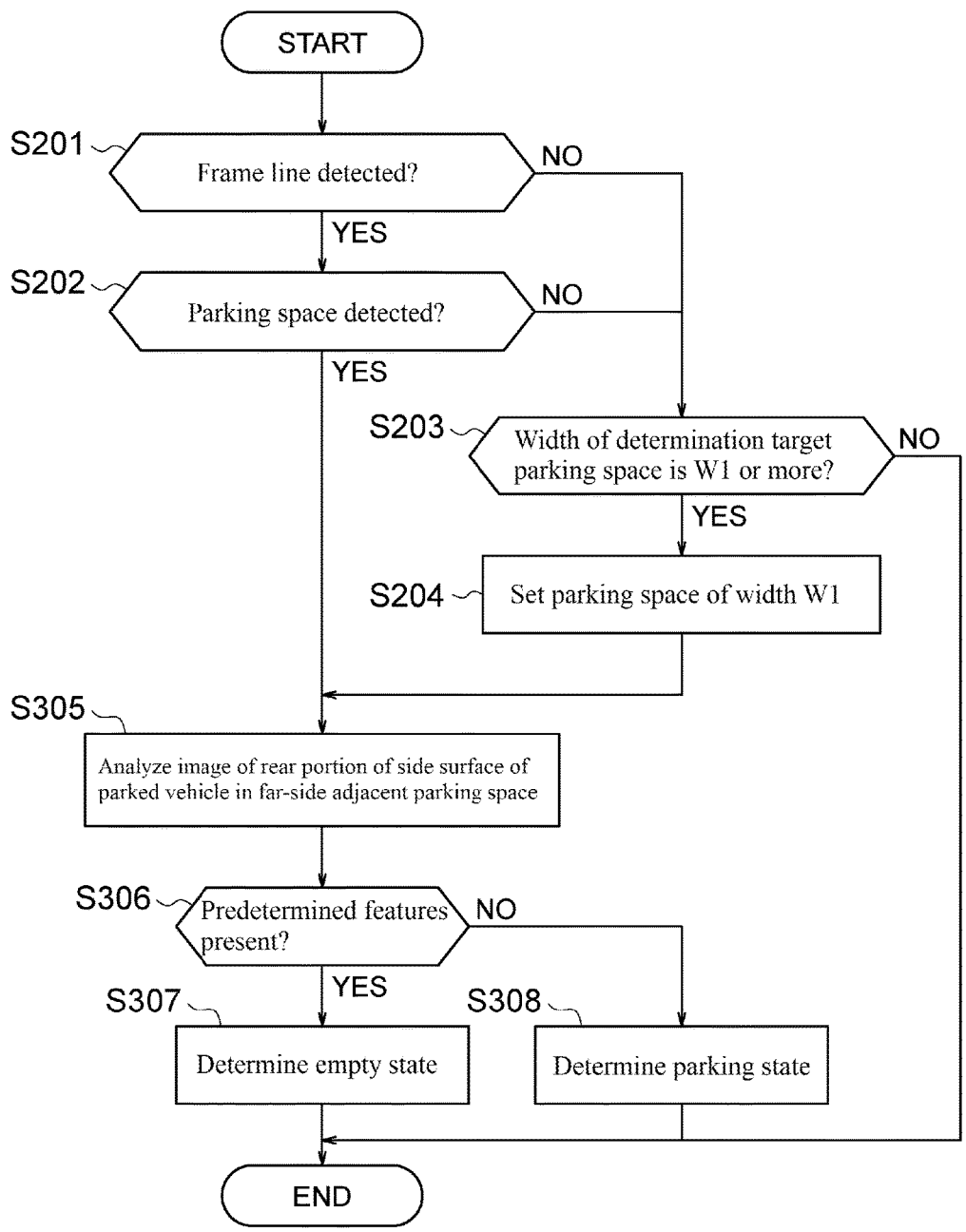
FIG. 18 is a flowchart illustrating the procedure in a second embodiment of the detection process executed by the control device to detect an available parking space.

FIG. 18 is a flowchart illustrating a procedure of the second embodiment of the detection process for parking possible space Me. The detection process is executed by the control device 10. The processing routine illustrated in this flowchart starts when a parked vehicle existing in a detected parking space PLn is detected. Repetitive description of the same processing as in the above-described first embodiment is omitted, and the description made in the first embodiment is borrowed herein.

The same steps S201 to S204 as in the first embodiment are followed by step S305 in which the control device 10 analyzes the image of the side surface of the parked space in the far-side adjacent parking space PL3. In this step, a known scheme such as pattern matching is employed to extract the side surface of the parked vehicle from the image captured by the camera 1 and extract predetermined features (e.g. the rear wheel 4, the rear lamp 5, the reflector 6, etc.) existing on the rear portion of the side surface of the parked vehicle from the image of the extracted side surface.

When the vehicle is parked backward in the far-side adjacent parking space PL3, predetermined features existing on the rear portion of the side surface of the parked vehicle are extracted, but when the vehicle is parked forward in the far-side adjacent parking space PL3, predetermined features (e.g. the front wheel, the front lamp, etc.) existing on the front portion of the side surface of the parked vehicle are extracted. In the case of the angle parking scheme, as in the right-angle parking scheme, predetermined features existing on the rear portion or front portion of the side surface of the parked vehicle in the far-side adjacent parking space PL3 are extracted. When parking spaces of the parallel parking scheme are located on the left side of the pathway for vehicles, predetermined features (e.g. the rear left tire, etc.) existing on the left-side portion of the rear part of the parked vehicle are extracted, and when parking spaces of the parallel parking scheme are located on the right side of the pathway for vehicles, predetermined features (e.g. the rear right tire, etc.) existing on the right-side portion of the rear part of the parked vehicle are extracted.

Examples of the method of extracting predetermined features include the pattern matching and a method of extracting reflection objects of which the luminance value is not less than a predetermined value. In the right-angle parking scheme, examples of the method of extracting the rear wheel or the front wheel include a method of extracting two wheels located along the longitudinal direction of the parking space (forward and reverse direction) and extracting a wheel located on the far side in the longitudinal direction of the parking space from among the extracted two wheels. In the parallel parking scheme, examples of the method of extracting the right or left tire include a method of extracting two tires located along the width direction of the parking space and extracting a tire located on the far side in the width direction of the parking space from among the extracted two wheels.

Step S305 is followed by step S306 in which the control device 10 determines whether or not the above predetermined features are detected in step S305. When a determination is made that the above predetermined features are detected, in step S307, the control device 10 determines that the determination target parking space PL2 is in an empty state. When a determination is made that the above predetermined features are not detected, in step S308, the control device 10 determines that the determination target parking space PL2 is in a parking state.

Thus, in the present embodiment, in the case of the right-angle or angle parking scheme, the control device 10 determines whether or not predetermined features such as a wheel exist on the rear portion of the side surface of the vehicle parked rearward in the far-side adjacent parking space PL3 (or on the front portion of the side surface of the vehicle parked forward in the far-side adjacent parking space PL3). Then, when the predetermined features exist, the control device 10 determines that the determination target parking space PL2 is in an empty state, while when the predetermined features do not exist, the control device 10 determines that the determination target parking space PL2 is in a parking state. In the present embodiment, when parking spaces of the parallel parking scheme are located on the left side of the pathway for vehicles, the control device 10 determines whether or not predetermined features such as a left tire exist on the left-side portion of the rear part of the parked vehicle in the far-side adjacent parking space. Then, when the predetermined features exist, the control device 10 determines that the determination target parking space is in an empty state, while when the predetermined features do not exist, the control device 10 determines that the determination target parking space is in a parking state. In the present embodiment, when parking spaces of the parallel parking scheme are located on the right side of the pathway for vehicles, the control device 10 determines whether or not predetermined features such as a right tire exist on the right-side portion of the rear part of the parked vehicle in the far-side adjacent parking space. Then, when the predetermined features exist, the control device 10 determines that the determination target parking space is in an empty state, while when the predetermined features do not exist, the control device 10 determines that the determination target parking space is in a parking state.

As a result, empty/parking of the determination target parking space PL2 can be accurately determined regardless of whether or not a parked vehicle exists in the near-side adjacent parking space PL1 and regardless of whether or not a frame line of the determination target parking space PL2 can be detected.

The "control device 10" in the above-described embodiments corresponds to examples of the "parked vehicle detector," the "measurement device," and the "parking space detector" in the present invention. The "camera 1" and the "ranging device 3" in the above described embodiments correspond to an example of the parking situation detector in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the length of the side surface of the parked vehicle in the far-side adjacent parking space PL3 is detected, and predetermined features of the parked vehicle are extracted, from the image captured by the camera 1, but this is not essential. The length of the side surface of the parked vehicle in the far-side adjacent parking space PL3 may be detected, and predetermined features of the parked vehicle may be extracted, on the basis of the ranging signals of the ranging device 3.

The above-described embodiments are described on the assumption of the existence of one or more cameras provided on the vehicle, but the present invention is not limited to this. In one or more embodiments of the present invention, a fixed camera provided in a parking lot, a camera of another vehicle, or a portable camera carried by the user may also be employed. In such a case, information on a parking space may be acquired from the outside to perceive the parking state of the parking space.

REFERENCE SIGNS LIST

1 Camera
3 Ranging device
10 Control device

The invention claimed is:

1. A parking space detection method for detecting a parking space in an empty state from parking situation information acquired by a parking situation detector configured to detect a situation of a parking lot, comprising:
   detecting a parked vehicle existing in a parking space on a far side from the parking situation detector, the parking space being adjacent to a determination target parking space for which the empty state is determined; and
   when a predetermined feature is detected from a region on a far side from the parking situation detector among right and left regions of a surface of the parked vehicle located at a side of the determination target parking space, detecting the determination target parking space as the parking space in the empty state.

2. A parking space detection method for detecting a parking space in an empty state from parking situation information acquired by a parking situation detector configured to detect a situation of a parking lot, comprising:
   detecting a parked vehicle existing in a parking space on a far side from the parking situation detector, the parking space being adjacent to a determination target parking space for which the empty state is determined; and
   when a predetermined feature is detected from a region on a far side from the parking situation detector among right and left regions of a surface of the parked vehicle located at a side of the determination target parking space, detecting the determination target parking space as the parking space in the empty state, the parking situation detector being located on a vehicle pathway adjacent to the determination target parking space.

3. The parking space detection method according to claim 1, comprising:
   acquiring a width of the parking space; and
   when the acquired width is a predetermined width or more, detecting the parking space as the determination target parking space.

4. A parking space detection device for detecting a parking space in an empty state from parking situation information acquired by a parking situation detector configured to detect a situation of a parking lot, comprising:
   a parked vehicle detector configured to detect a parked vehicle existing in a parking space on a far side from the parking situation detector, the parking space being adjacent to a determination target parking space for which the empty state is determined; and
   a parking space detector configured to, when a predetermined feature is detected from a region on a far side from the parking situation detector among right and left regions of a surface of the parked vehicle located at a side of the determination target parking space, detect the determination target parking space as the parking space in the empty state.

5. The parking space detection method according to claim 2, comprising:
   acquiring a width of the parking space; and
   when the acquired width is a predetermined width or more, detecting the parking space as the determination target parking space.

* * * * *